United States Patent
Yamazaki et al.

[11] Patent Number: 6,147,735
[45] Date of Patent: Nov. 14, 2000

[54] REFLECTION-TYPE LIQUID CRYSTAL DISPLAYING APPARATUS

[75] Inventors: Tetsuhiro Yamazaki, Yokohama; Masanobu Shigeta; Shinichi Hirose, both of Yokosuka; Tsutou Asakura, Odawara; Tetsuji Suzuki; Tatsuru Kobayashi, both of Yokosuka; Shintaro Nakagaki, Miura, all of Japan

[73] Assignee: Victor Company of Japan, Ltd., Yokohama, Japan

[21] Appl. No.: 09/124,248

[22] Filed: Jul. 29, 1998

[30] Foreign Application Priority Data

Jul. 29, 1997 [JP] Japan .................................. 9-217964
Nov. 25, 1997 [JP] Japan .................................. 9-339372

[51] Int. Cl.$^7$ .................................................. G02F 1/1335
[52] U.S. Cl. .............................. 349/117; 349/9; 349/57; 349/121
[58] Field of Search ................................ 349/117, 9, 57, 349/121

[56] References Cited

U.S. PATENT DOCUMENTS

| | | | |
|---|---|---|---|
| 4,007,979 | 2/1977 | Coblitz | 350/156 |
| 4,398,805 | 8/1983 | Cole | 350/345 |
| 4,751,387 | 6/1988 | Robillard | 250/331 |
| 5,122,895 | 6/1992 | Takanashi et al. | 359/247 |
| 5,196,953 | 3/1993 | Yeh et al. | 359/73 |
| 5,214,457 | 5/1993 | Takanashi et al. | 353/31 |
| 5,298,199 | 3/1994 | Hirose et al. | 264/2.6 |
| 5,999,282 | 12/1999 | Suzuki et al. | 359/20 |

FOREIGN PATENT DOCUMENTS 08294453 11/1996 Japan .
08334863 12/1996 Japan .

Primary Examiner—William L. Sikes
Assistant Examiner—Tarifur R. Chowdhury
Attorney, Agent, or Firm—Jacobson, Price, Holman & Stern, PLLC

[57] ABSTRACT

A liquid crystal displaying apparatus has a reflection-type liquid crystal display with vertical orientation-mode liquid crystals, to modulate linearly polarized light. Also provided is a polarization and diffracting section to convert read light beams obliquely incident thereto to the linearly polarized light, to allow the linearly polarized light to be incident to the liquid crystal display, allow first polarized light components of the linearly polarized light modulated by the liquid crystal display to pass therethrough, the first polarized light components vibrating in a first direction perpendicular to a second direction in which the linearly polarized light vibrates, and diffract second polarized light components of the linearly polarized light to a third direction from which the read light beams be incident to the liquid crystal display, the second polarized light components vibrating in the second direction. Further provided are a quarter wavelength plate to allow elliptically polarized light which includes the first polarized light components and a small quantity of the second polarized light components to pass therethrough when the liquid crystal display is active for modulation, and a polarizer to allow polarized light components of the elliptically polarized light to pass therethrough, the polarized light components matching a transmission axis of the polarizer.

1 Claim, 19 Drawing Sheets

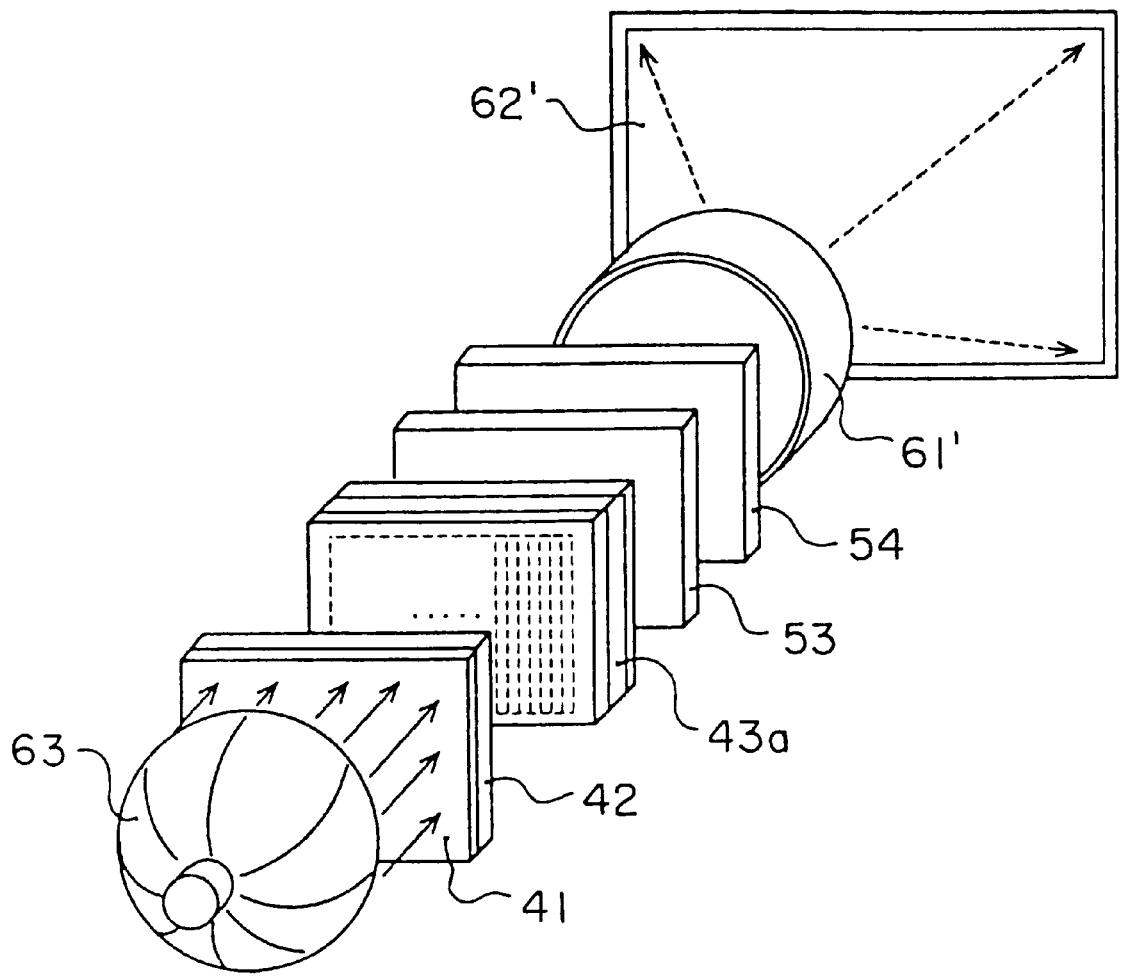
F I G. 12

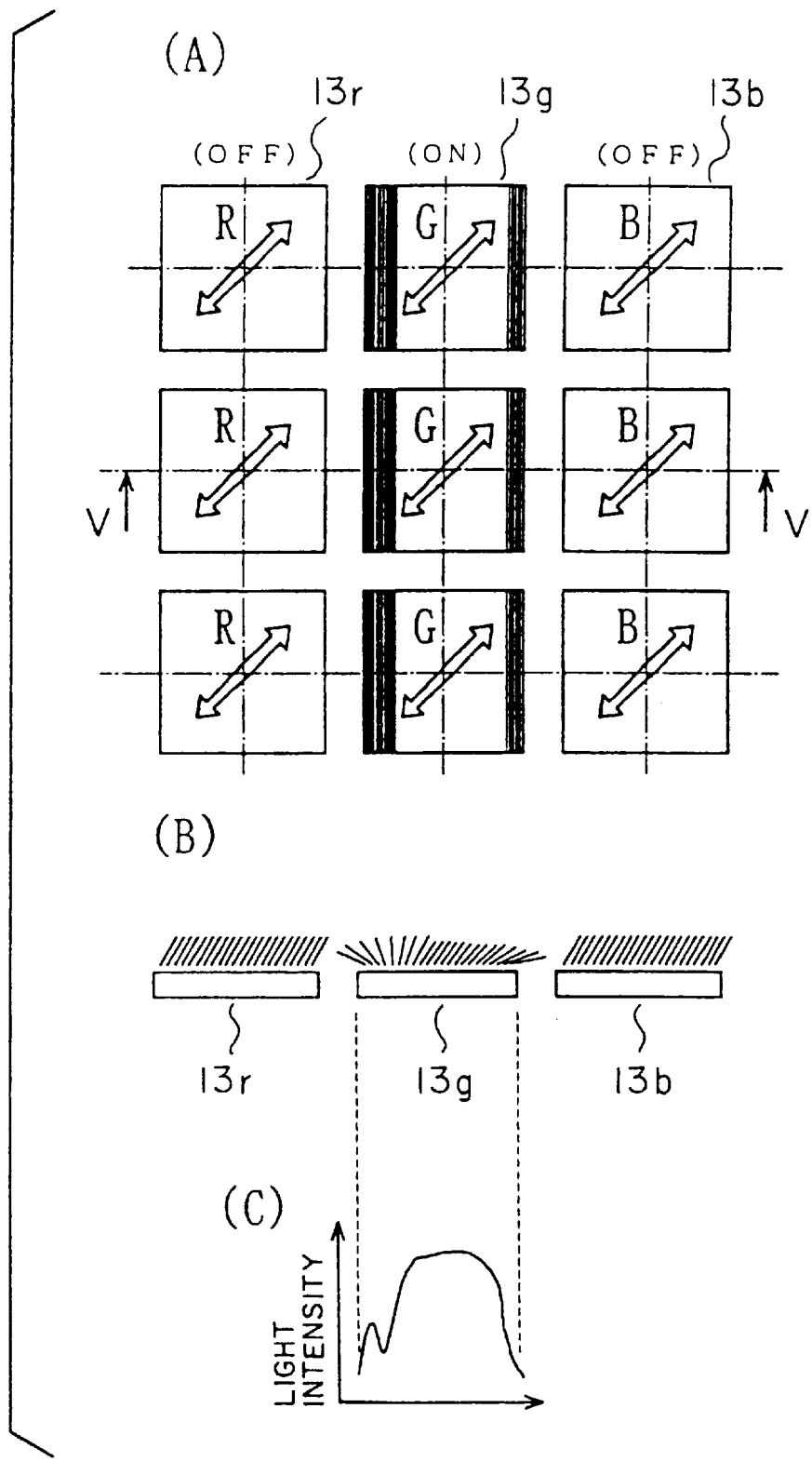
F I G. 20

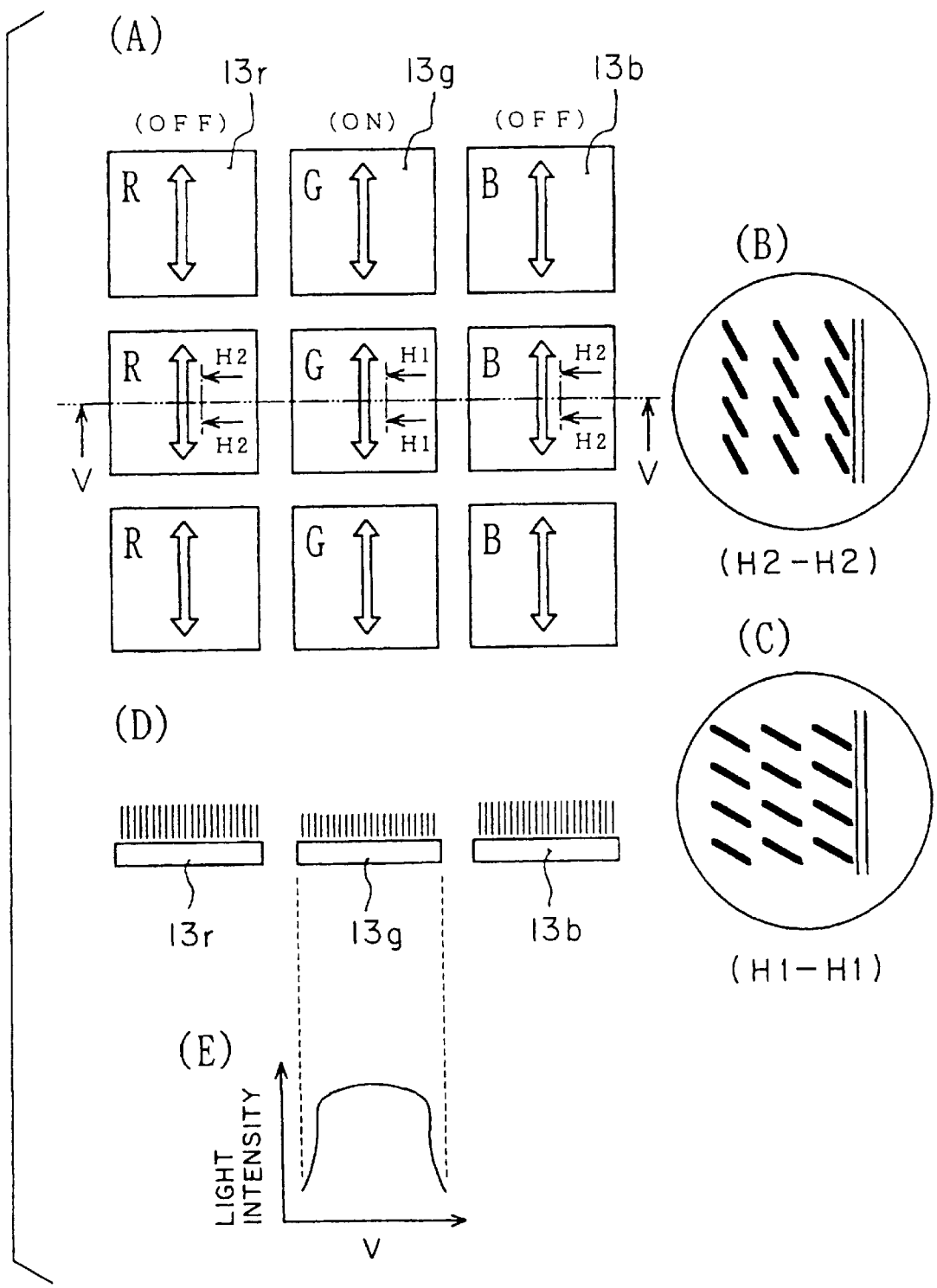
F I G. 21

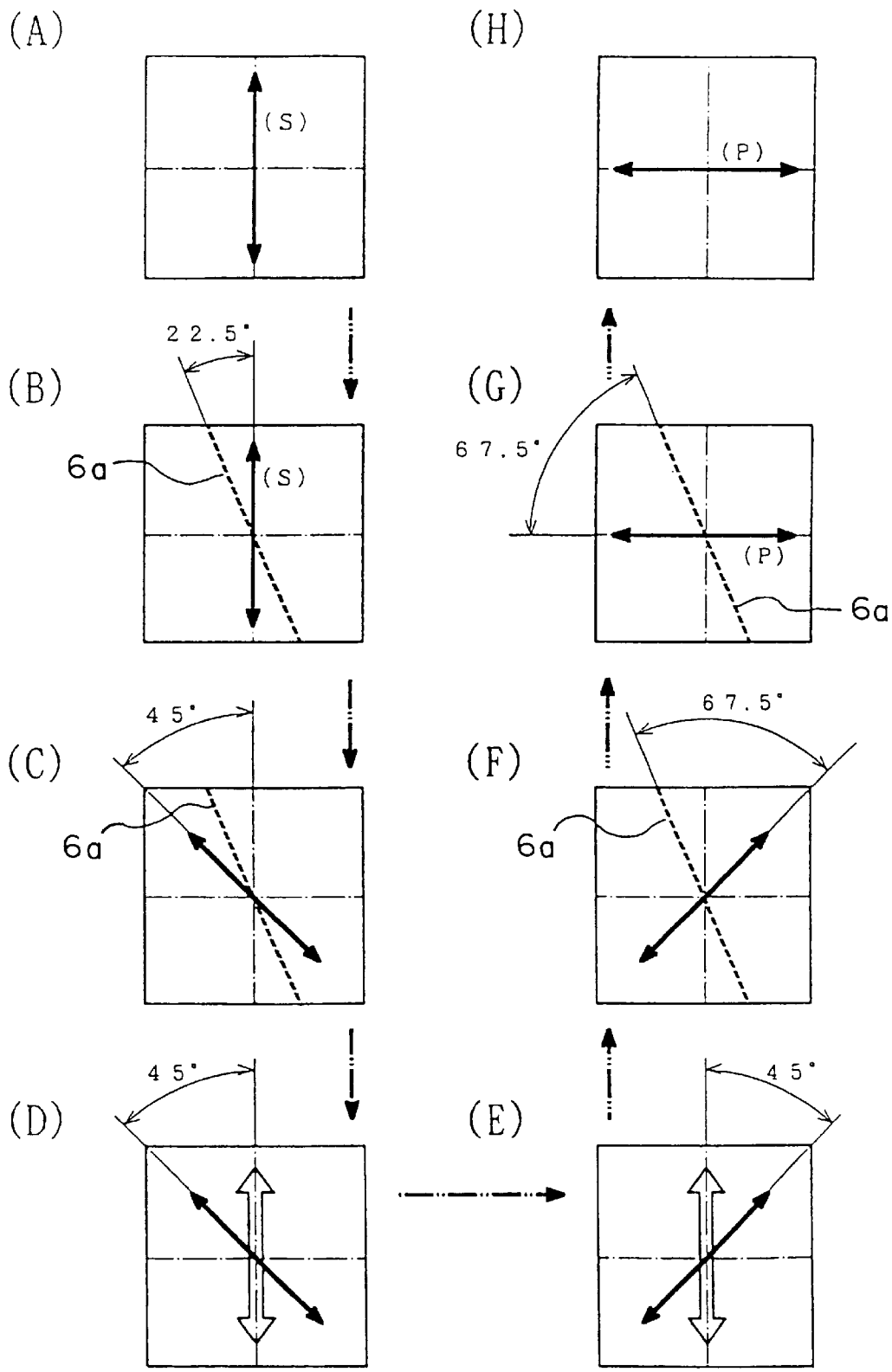
F I G. 22

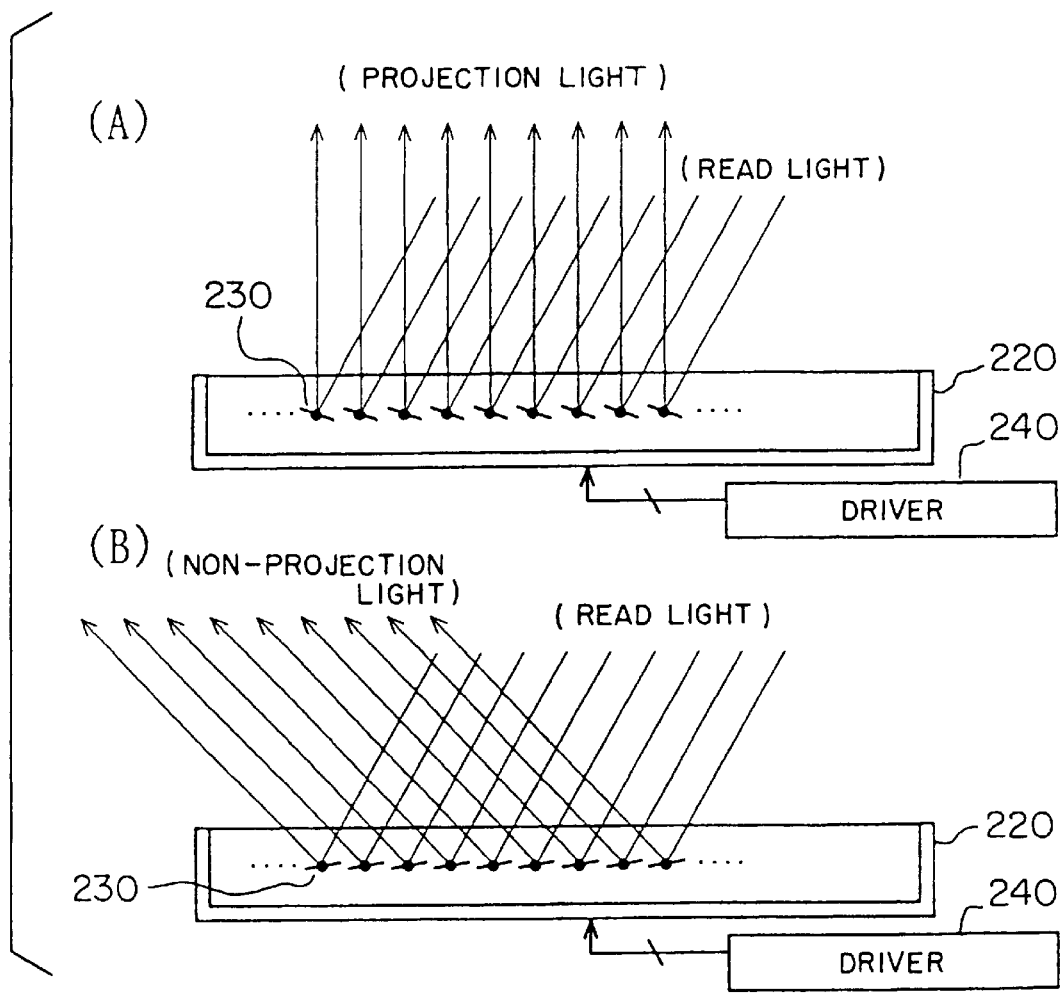
F I G. 26

REFLECTION-TYPE LIQUID CRYSTAL DISPLAYING APPARATUS

BACKGROUND OF THE INVENTION

This invention relates to a liquid crystal displaying apparatus applied to projectors and projection-type displaying apparatuses of various sizes, such as view finders, personal computers and large screen televisions.

Apparatuses such as flat panel displays and video projectors with liquid crystal displays have been developed. And, there has been increased demand for video projectors to display images on a large screen.

Video projectors are roughly classified into two types, that is, a transmission type and a reflection type. The transmission-type video projector is provided with a transmission-type active-matrix liquid crystal display. And, the reflection-type video projector is provided with a reflection-type active-matrix liquid crystal display.

FIG. 1 illustrates an active-matrix liquid crystal display device in a sectional view corresponding to one pixel.

The active-matrix liquid crystal display includes a MOSFET 2 and a charge storage capacitor 3 formed on a silicon substrate 1. The MOSFET 2 consists of a drain 5, a gate 6 and a source 7. An Al reflecting electrode layer 8 is formed over the MOSFET 2 via an insulating layer 4. A lower portion of the reflecting electrode layer 8 is connected to the source 7 of the MOSFET 2. A flat signal detecting section 9 is extended from the connecting portion toward the lateral direction. The signal detecting section 9 and an insulating film 10 interposed between the signal detecting section 9 and the substrate 1 constitute the charge storage capacity 3.

The MOSFET 2 serving as a switching element and the charge storage capacitor portion 3 for one pixel constitute an active element circuit with respect to the substrate 1. An active element substrate 11 is constituted as a whole.

A transparent common electrode film 23 is formed on one side of a glass substrate 22 to constitute a transparent substrate 21.

The insulating layer 4 and the reflection electrode layer 8 are covered by an orientation film 12. And, the transparent common electrode film 23 is covered by an orientation film 24. A liquid crystal layer 25 is put between the orientation films 12 and 24 and is hermetically sealed therebetween.

The operation of the liquid crystal display shown in FIG. 1 will be described with reference to the equivalent circuit diagram of FIG. 2.

As shown in FIG. 2, a gate line Xj and a signal line Yj are connected to the gate 6 and the drain 5, respectively, of each MOSFET 2. The gate line Xj and the signal line Yj supply a select signal and a video signal to the gate 6 and the drain 5, respectively.

The MOSFET 2 are turned on when the select signal from an X-address circuit is applied to each gate 6 through the gate line Xj. The video signal is then supplied to the reflection electrode layer 8 through the drain 5 and the source 7 to charge the charge storage capacitor 3 through the signal detection section 9.

The reflection electrode layer 8 will be held at a specific potential for a period of time determined by the time constant decided by the capacity and the discharge resistance of charges stored in the charge storage capacitor 3 even if the select signal on the gate line Xj is set at zero level.

A voltage generated across the reflection electrode layer 8 and the common electrode film 23 is applied to the liquid crystal layer 25 for the period of time determined by the time constant to reorient the liquid crystal molecules under an electric field generated by the applied voltage. This liquid crystal molecule reorientation controls polarization of light transmitted through the liquid crystal layer 25. At the same time, the voltage applied to the liquid crystal layer 25 is controlled with a video signal from a Y-address circuit supplied on the signal line Yj to modulate light beams which are incident (as read light) to the glass substrate 22, reflected by the reflection electrode layer 8 and emitted (as reflected light) from the glass substrate 22.

Practically, a select signal is supplied to the gate line Xj to turn on all the MOSFETs 2 connected to the gate line Xj. Then, each charge storage capacitors 3 of these MOSFETs 2 is charged with a video signal supplied to a signal line Yj, thereby modulating the incident light beams per pixel while being reflected from the reflection electrode layer 8.

Japanese Patent Application No. 294453/1996 discloses, in FIG. 3, a reflection-type color liquid crystal displaying apparatus with the liquid crystal display explained above.

In FIG. 3, laminated on a reflection-type liquid crystal display device 31 are a thin plate glass layer 32, a color filter 33, a glass substrate 34, and a coupling prism 35. The color filter 33 is made of a transmission-type hologram with laminated holographic lens array layers 33r, 33g and 33b corresponding to three primary colors of R, G and B, respectively. The lens array layers 33r, 33g and 33b included holographic lenses 33re, 33ge and 33be, respectively. The coupling prism 35 is made of a flat glass plate with one end surface and the upper surface. The end surface is formed so that read light beams obliquely incident to the color liquid crystal displaying apparatus are vertically incident thereto. The read light beams incident to the color liquid crystal displaying apparatus via the end surface are modulated as described later and emitted therefrom via the upper surface.

In detail, the read light beams are incident to the color filter 33 via the coupling prism 35 and the glass substrate 34. The holographic lenses 33re, 33ge and 33be diffract only S-polarized light components of the incident light beams for each primary color. The S-polarized light components diffracted for each primary color are vertically focused onto pixel electrodes 8r, 8g and 8b of a liquid crystal display device 31, respectively.

On the other hand, P-polarized light components of the incident light beams are transmitted through the color filter 33, reflected by the reflection electrode layer 8, and emitted outside the color liquid crystal displaying apparatus.

The liquid crystal display device 31 has basically the same structure as the device shown in FIG. 1. The thin plate glass layer 32 corresponds to the glass substrate 22 of FIG. 1. The device 31 is provided with a dielectric mirror film 26 to achieve high reflection factor, which is interposed between the orientation film 12 and the reflection electrode layer 8.

The pixel electrodes 8r, 8g and 8b of the reflection electrode layer 8 are arranged into a mosaic or stripe. Voltages for one pixel to be displayed are applied to one group of pixel electrodes 8r, 8g and 8b based on a video signal. Because pixels for the one group of pixel electrodes constitute the one pixel to be displayed.

Under the configuration, the S-polarized light components diffracted for the primary colors are focused on the pixel electrodes 8r, 8g and 8b and reflected by the dielectric mirror film 26. The reflected S-polarized light components are incident again to the liquid crystal layer 25 and also to the color filter 33. The reflected S-polarized light components incident to the liquid crystal layer 25 are converted into P-polarized light components according to a modulation factor decided by the video signal when transmitted through the liquid crystals. Because the liquid crystals have been reoriented for each pixel by an electric field generated across the pixel electrodes 8r, 8g and 8b, and the common electrode film 23.

The P-polarized light components converted by the liquid crystal layer 25 are transmitted through the color filter 33 and emitted from the coupling prism 35 through its upper surface. On the other hand, the S-polarized light component are diffracted by the color filter 33 and returned to the direction from which the read light beams have been incident to the color liquid crystal displaying apparatus because the color filter 33 diffracts S-polarized light components only.

The P-polarized light components are then transmitted through a polarization plate 36 provided on the upper surface of the coupling prism 35. The P-polarized light components are further transmitted to an optical system and projected on a screen. The polarization plate 36 is provided such that its transmission axis is set in a direction in which only the P-polarized light components are allowed to be transmitted therethrough.

The color liquid crystal displaying apparatus using modulated P-polarized light components as projection light beams is provided with the polarization plate 36 to prevent decrease in contrast of a color image to be displayed. The decrease in contrast will occur if the polarization plate 36 is not employed because the color filter 33 allows not only the P-polarized light components but also the S-polarized light components to pass therethrough.

Next, FIG. 4 illustrates another color liquid crystal displaying apparatus with a transmission-type liquid crystal display.

The color liquid crystal displaying apparatus is provided with two polarization plates 41 and 44. Laminated therebetween are a color filter 42 made of a transmission-type hologram, and a transmission-type liquid crystal display 43.

The transmission-type apparatus employs the liquid crystal display 43 the substrate and pixels electrodes of which are made of transparent materials, and hence no dielectric mirror film is provided.

The color filter 42 is capable of light diffraction and focusing, however, not conversion of polarization of read light vertically incident thereto.

When read light beams are incident to the polarization plate 41 in advance, only the S-polarized light components of the read light beams are transmitted to the color filter 42. The S-polarized light components are diffracted by the color filter 42 into S-polarized light components corresponding to primary colors R, G and B and focused on the corresponding pixel electrodes of the liquid crystal display 43.

The diffracted S-polarized light components that pass through the pixel electrodes are incident to a liquid crystal layer and converted into P-polarized light components according to a modulation factor decided by a video signal when transmitted through the liquid crystals. Because the liquid crystals have been reoriented for each pixel by the pixel electrodes.

As described above, a color liquid crystal display apparatus is a combination of a liquid crystal display and a color filter. And, the liquid crystal display includes vertical orientation mode-liquid crystals, such as nematic liquid crystals with negative dielectric anisotropy to achieve high contrast ratio in image projection. The nematic liquid crystals are controlled such that liquid crystal molecules aligned in a direction perpendicular to the substrate is reoriented by a voltage applied thereto. The vertical orientation mode-liquid crystals exhibit sharp variation in light transmission factor to applied voltage, or sharp threshold characteristics, to achieve an image of high contrast ratio. In this regard, vertical orientation mode-liquid crystals with a visual field angle of 140° or more and a response time of 25 ms or less have been developed.

In liquid crystal display, a narrow pixel electrode pitch achieves high resolution of image, however, this causes a lateral electric field between adjacent pixels and which affects liquid crystals as shown in FIG. 5. The vertical orientation mode-liquid crystal display is apt to undergo its influence, that is, orientation of liquid crystal molecules are disturbed to cause disclination.

In other words, white information displaying will not generate a lateral electric field between pixel electrodes because the same level voltages are applied to R, G and B pixels. On the other hand, Ye (yellow) displaying will generate a lateral electric field because a voltage applied to a B pixel electrode is lower than those applied to R and G pixel electrodes. This results in disclination which affects modulation in an area where liquid crystals are subjected to the disclination. This causes low luminance, color balance, color purity, and so on.

Generally, disclination can be prevented by rubbing on the orientation film to have a large pretilt angle of liquid crystals to limit reorientation for prevention of disclination. However, a large pretilt angle in vertical orientation mode-liquid crystal will cause a relatively large double refraction on liquid crystal molecules even under no electric field. This results in low contrast ratio. In other words, there exists a contradictory relationship between contrast ratio and color reproducibility by preventing disclination.

In order to solve this problem, the applicant of this application has proposed a liquid crystal display (in Japanese Patent Application No. 334863/1996) in which a pretilt angle $\alpha_1$ given by an orientation film 12 of active element substrate 11 side is set larger than an pretilt angle $\alpha_2$ given by orientation film 24 of transparent substrate 21 side as shown in FIG. 6.

This liquid crystal display achieves prevention of disclination without lowering contrast ratio by limiting reorientation liquid crystal molecules in the vicinity of the active element substrate 11 where a large lateral electric field is generated and making small the pretilt angle $\alpha_2$ in the vicinity of the transparent substrate 21 where a small lateral electric field is generated. However, the pretilt angle $\alpha_1$ must be set at 4 degrees or more, and hence no sufficiently high contrast ratio is still achieved.

SUMMARY OF THE INVENTION

An object of this invention is to provide a liquid crystal displaying apparatus with vertical orientation mode-liquid crystals, which achieves a satisfactory contrast ratio while restricting reorientation of the liquid crystals.

The present invention provides a liquid crystal displaying apparatus comprising: a reflection-type liquid crystal display including vertical orientation-mode liquid crystals, to modulate linearly polarized light; means for converting read light beams obliquely incident thereto to the linearly polarized light, allowing the linearly polarized light to be incident to the liquid crystal display, allowing first polarized light components of the linearly polarized light modulated by the liquid crystal display to pass therethrough, the first polarized light components vibrating in a first direction perpendicular to a second direction in which the linearly polarized light vibrates, and diffracting second polarized light components of the linearly polarized light to a third direction from which the read light beams be incident to the liquid crystal display, the second polarized light components vibrating in the second direction; a quarter wavelength plate to allow elliptically polarized light which includes the first polarized light components and a small quantity of the second polarized light components to pass therethrough when the liquid crystal display is active for modulation; and a polarizer to allow polarized light components of the elliptically polarized light to pass therethrough, the polarized light components matching a transmission axis of the polarizer.

Furthermore, the present invention provides a liquid crystal displaying apparatus comprising: a transmission-type liquid crystal display including vertical orientation-mode liquid crystals, to modulate linearly polarized light into elliptically polarized light; a first polarizer to convert read light beams to the linearly polarized light and to allow the linearly polarized light to be incident to the liquid crystal display; a quarter wavelength plate to allow the elliptically polarized light to pass therethrough when the liquid crystal display is active for modulation; and a polarizer to allow polarized light components of the elliptically polarized light to pass therethrough, the polarized light components matching a transmission axis of the polarizer.

Furthermore, the present invention provides a reflection-type color displaying apparatus comprising: a liquid crystal display including a transparent common electrode layer, a liquid crystal layer, and a reflection-type pixel electrode layer capable of individually driving pixel electrodes disposed for every respective colors, pixel electrodes related to a same color being aligned in a predetermined direction, a direction of orientation of liquid crystal molecules in the liquid crystal layer being set so that a projected mapped image with respect to the reflection-type pixel electrode layer in the orientation direction substantially matches the arraignment direction of the pixel electrodes; a color filter made of hologram for diffracting polarized light components from incident light and focusing the diffracted polarized light components onto the corresponding pixel electrodes; and a phase plate provided between the color filter and the liquid crystal display, to allow the polarized light components diffracted by the color filter to be incident to the liquid crystal display while a polarization plane of the polarized light components passing through the color filter is rotating at an angle of substantially 45 degrees relative to the alignment direction of the pixel electrodes, and to allow the polarized light components modulated and reflected by the liquid crystal display to be incident to the color filter while a polarization plane of the modulated and reflected polarized light components is rotating by substantially 135 degrees.

Furthermore, the present invention provides a transmission-type color displaying apparatus comprising: a liquid crystal display including a transparent common electrode layer, a liquid crystal layer, and a transparent pixel electrode layer capable of individually driving pixel electrodes disposed for every respective colors, pixel electrodes related to a same color being aligned in a predetermined direction, a direction of orientation of liquid crystal molecules in the liquid crystal layer being set so that a projected mapped image with respect to the transparent pixel electrode layer in the orientation direction is substantially matches the arraignment direction of the pixel electrodes; a color filter made of hologram for diffracting polarized light components from incident light and focusing the diffracted polarized light components onto the corresponding pixel electrodes; and a phase plate provided between the color filter and the liquid crystal display, to rotate a polarization plane of the polarized light components passing through the color filter at an angle of substantially 45 degrees relative to the alignment direction of the pixel electrodes; and an analyzer provided at an emitting side of the liquid crystal display, to allow the polarized light components modulated by the liquid crystal display to pass therethrough.

Furthermore, the present invention provides a color displaying apparatus comprising: a color filter made of hologram for diffracting polarized light components from incident light; rotatable micro mirrors for respective colors onto which the diffracted polarized light components are focused; a modulator to rotate each micro mirror in accordance with a pixel signal; and a phase plate interposed between the color filter and the modulator, to convert linearly polarized light emitted from the color filter into circularly polarized light, and to convert circularly polarized light omitted from the modulator into linearly polarized light having a polarization plane rotated by 90° degrees relative to another polarization plane of the linearly polarized light.

BRIEF DESCRIPTION OF THE DRAWINGS

FIG. 12 is a perspective view of the second embodiment of the liquid crystal picture displaying apparatus shown in FIG. 11;

FIG. 20 illustrates reorientation of liquid crystals and light intensity;

FIG. 21 illustrates reorientation of liquid crystals and light intensity of this invention;

FIG. 22 illustrates change in polarization;

FIG. 26 illustrates an operation of micro mirror device of the sixth embodiment shown in FIG. 25.

DETAILED DESCRIPTION OF THE PREFERRED EMBODIMENTS

Preferred embodiments of a liquid crystal displaying apparatus according to the present invention will be described with reference to the attached drawings.

Figure 1:
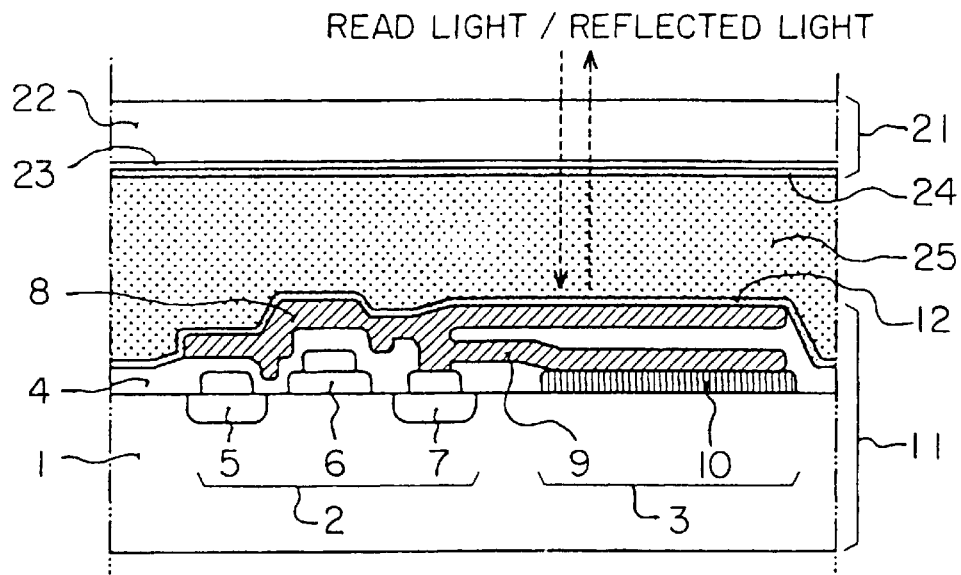
FIG. 1 is a cross sectional view of a conventional liquid crystal display device for one pixel.
Figure 2:
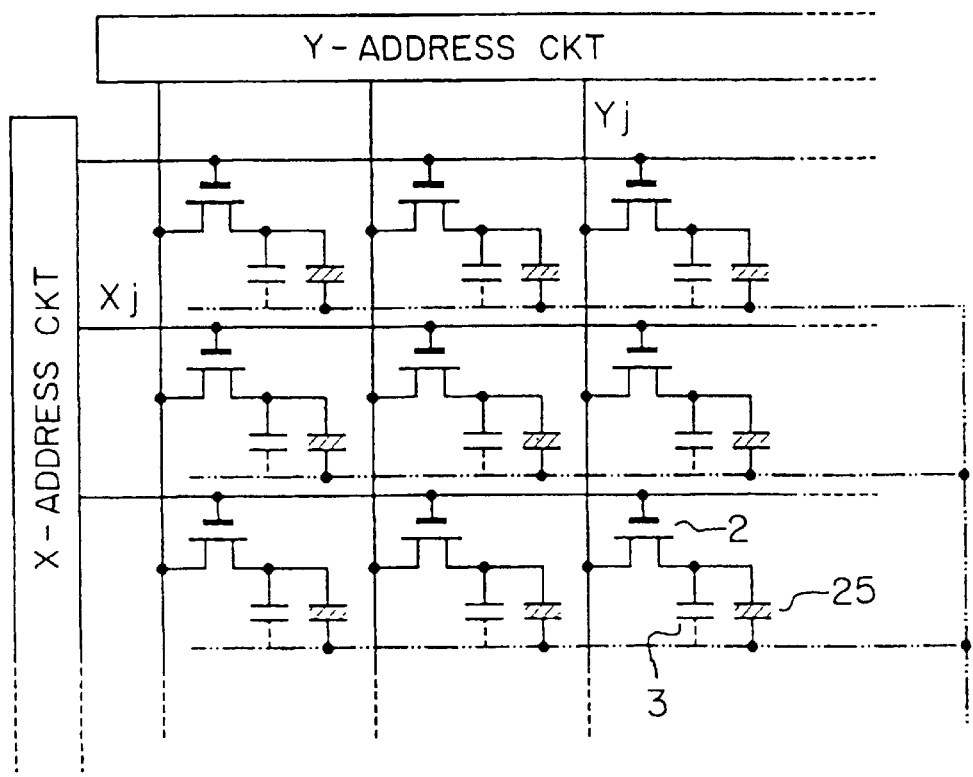
FIG. 2 is an equivalent circuit diagram of the apparatus shown in FIG. 1.
Figure 3:
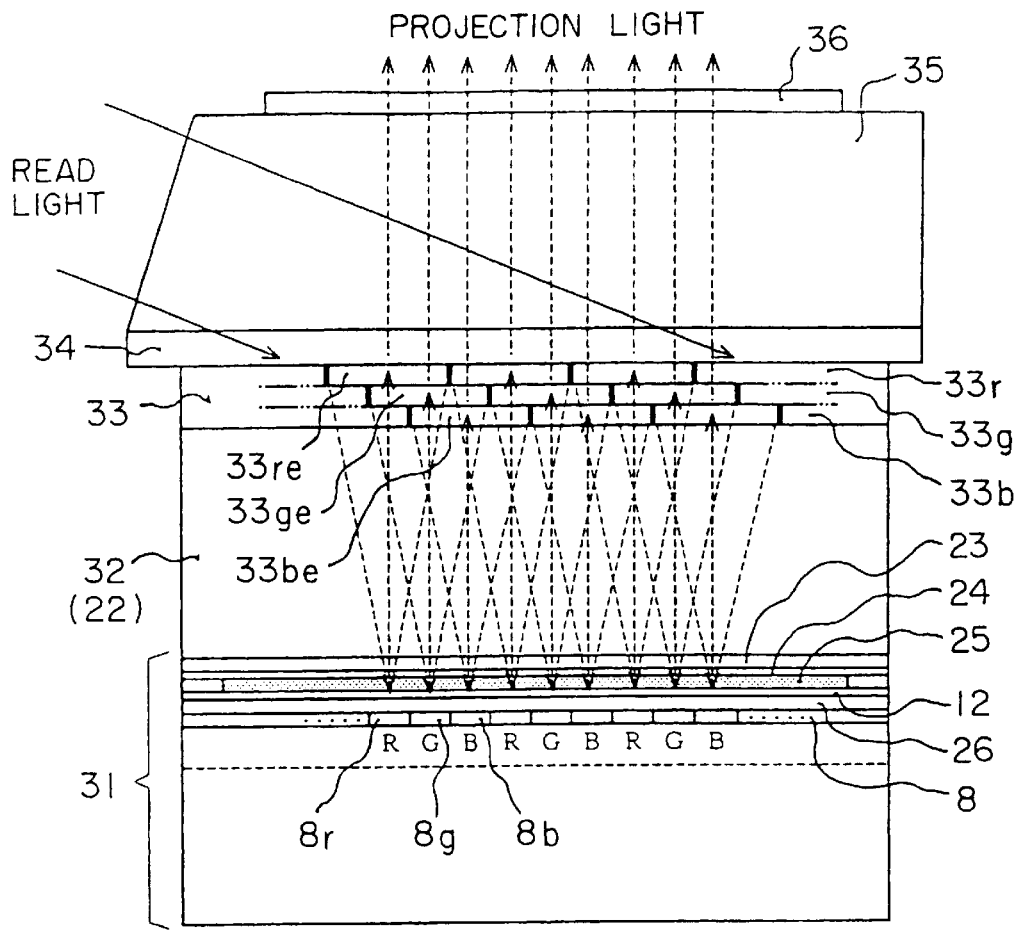
FIG. 3 is a cross sectional view of a conventional liquid crystal displaying apparatus using the device shown in FIG. 1.
Figure 7A:
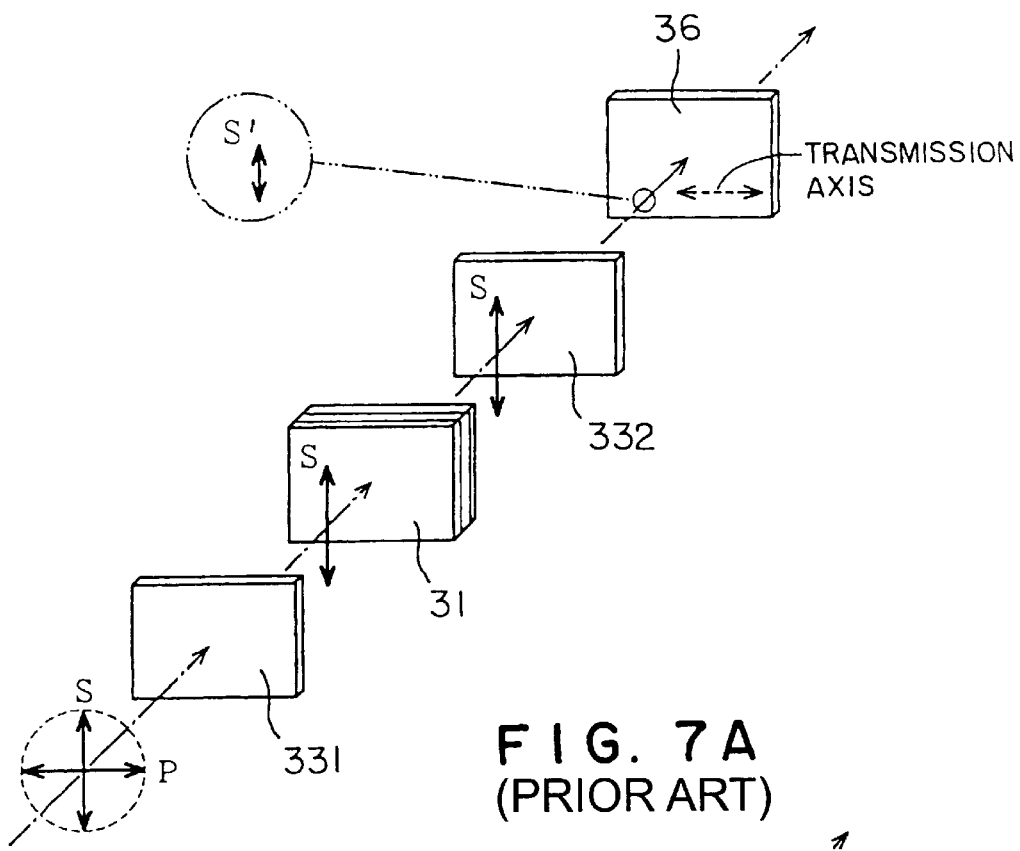
FIG. 7A illustrates an optical element arrangement in the apparatus shown in FIG. 3 where liquid crystals have a small pretilt angle.
Figure 7B:
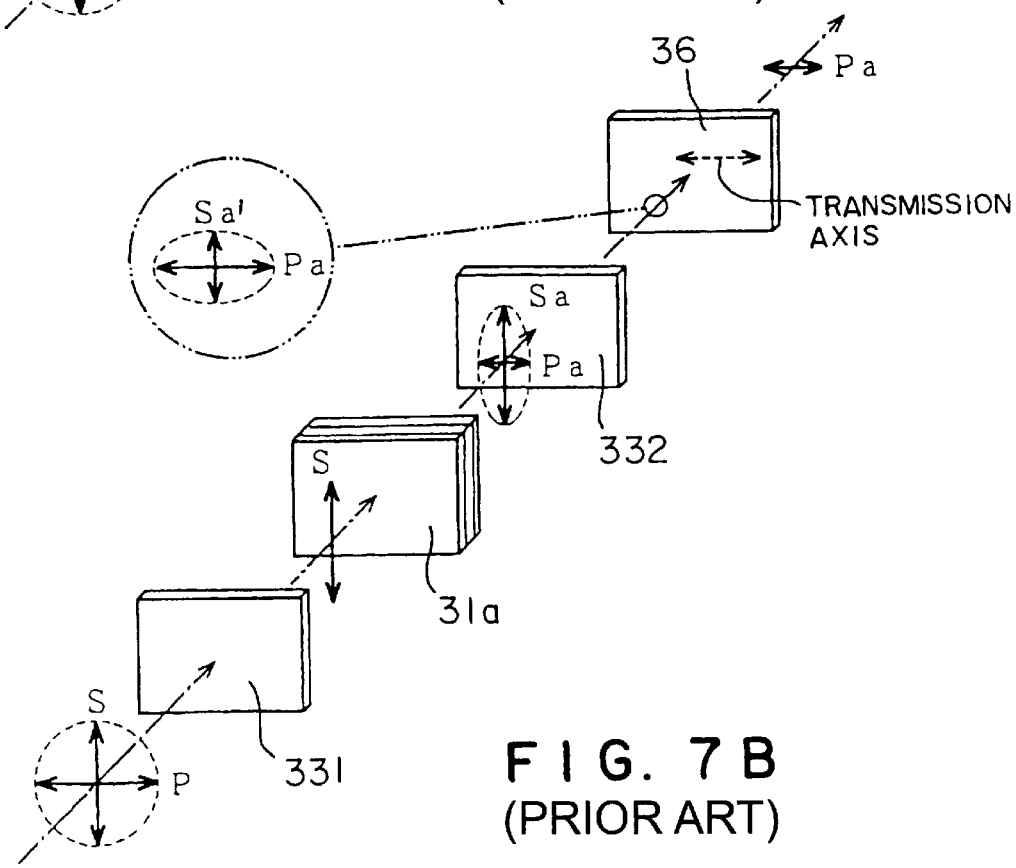
FIG. 7B illustrates another optical element arrangement in the apparatus shown in FIG. 3 where liquid crystals have a large pretilt angle.

Before describing the first embodiment, disadvantages of the conventional apparatus shown in FIG. 3 will further be discussed. FIGS. 7A and 7B illustrates optical element arrangements in the apparatus shown in FIG. 3, where optical paths in the reflection-type apparatus are made into straight. Actually one, but two color filters 331 and 332 are illustrated, both corresponding to the color filter 33 for this reason. FIG. 7A illustrates an arrangement having the liquid crystal display 31 with a small pretilt angle of liquid crystals. On the other hand, FIG. 7B illustrates another arrangement having a liquid crystal display 31a with a large pretilt angle for prevention of disclination which would occur due to a lateral electric field produced between pixel electrodes.

As shown in FIG. 7A, when circularly polarized light (read light) beams are incident to the color filter 331 from a light source (not shown), the light beams are diffracted and only S-polarized light components are incident to the liquid crystal display 31. The S-polarized light components will be reflected by the liquid crystal display 31 when not active for modulation and go back to the color filter 332 due to the small pretilt angle of the liquid crystals.

A color filter with ideal diffraction characteristics would diffract all the S-polarized light components to the light source, and thus no projection light beams will be generated. The color filter 331 (332) made of transparent hologram, however, does not have such a ideal diffraction characteristics, and hence S-polarized light components S' of small quantity pass through the color filter 332 and incident to the polarization plate 36.

The S-polarized light components S' will, however, be interrupted by the color filter 332 and not become projection light beams. Because the polarization plate 36 is provided such that its transmission axis is set in the direction where only P-polarized light components are allowed to pass therethrough.

On the other hand as shown in FIG. 7B, the S-polarized light components incident to the liquid crystal display 31a with the large pretilt angle undergo double refraction and converted into small quantity of P-polarized light components Pa and large quantity of S-polarized light components Sa, that is, the incident S-polarized light components are converted into elliptically polarized light components.

When the elliptically polarized light components are re-enter the color filter 332, small quantity of the S-polarized light components Sa' and most of the P-polarized light components Pa pass therethrough, and thus elliptically polarized light components are incident to the polarization plate 36.

The polarization plate 36 interrupts the S-polarized light components Sa' like the case shown in FIG. 7A, but allows the P-polarized light components Pa pass therethrough, which will become light beams to be projected on a screen (not shown). This will cause low contrast ratio in a normally black mode because small quantity of P-polarized light components Pa will be projected onto a screen even if the liquid crystal display 31a is not active for modulation.

The first preferred embodiment of a liquid crystal displaying apparatus according to the present invention will now be described.

Figure 8:
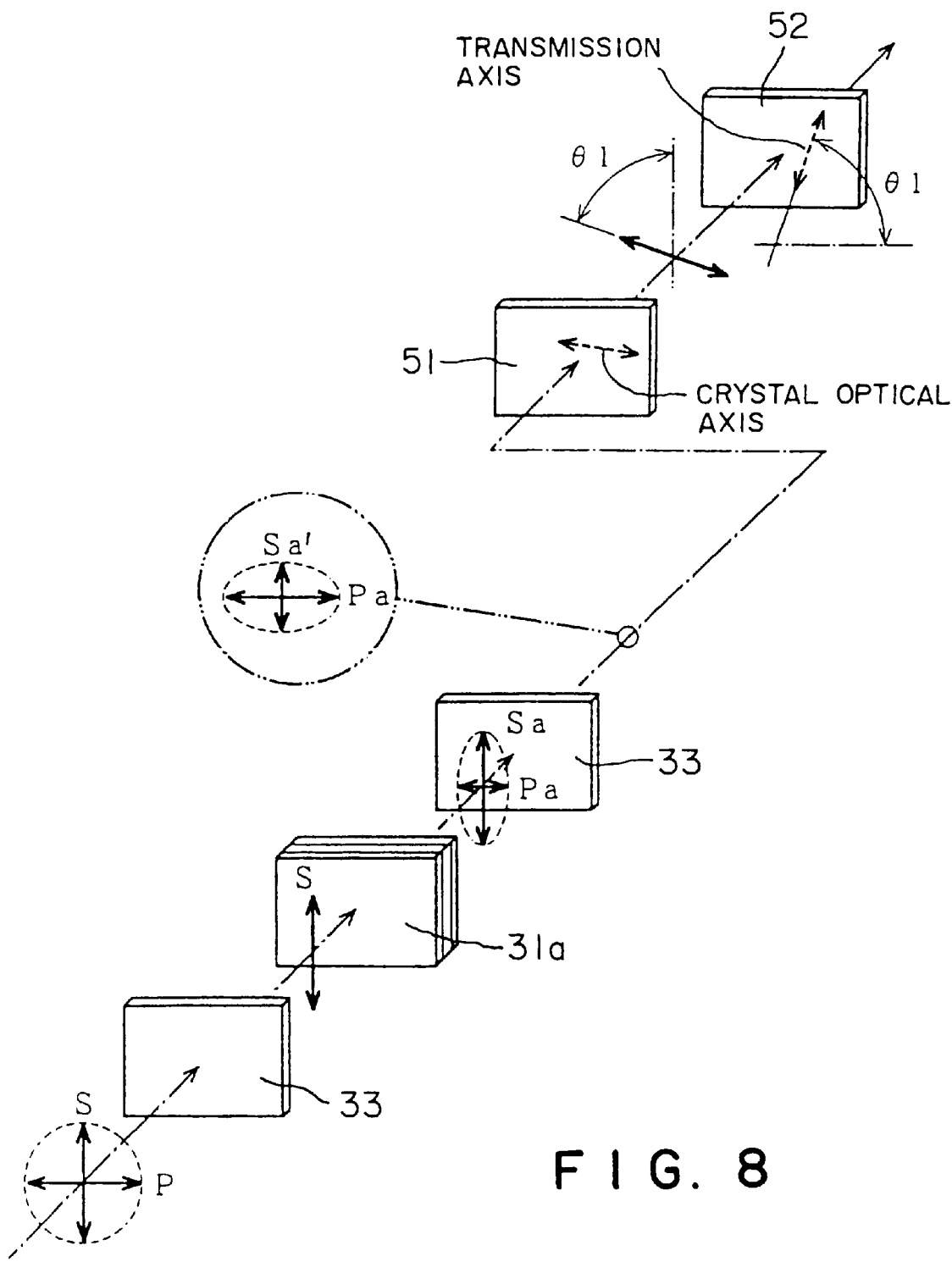
FIG. 8 illustrates the first embodiment of a liquid crystal picture displaying apparatus according to the invention.

As illustrated in FIG. 8, this embodiment is provided with a quarter wavelength plate 51 and a polarization plate 52 at the light emitting side of the color filter 33 without using the polarization plate 36 shown in FIGS. 7A and 7B. The quarter wavelength plate 51 and the polarization plate 52 have the optical characteristics (1) and (2) listed below, respectively, to prevent lowering of contrast ratio of image which would be caused due to existence of the liquid crystal display 31a with a large pretilt angle of liquid crystals.

(1) The quarter wavelength plate 51 is provided such that its optical axis is set in the direction where elliptically polarized light, a combination of S-polarized light components Sa' and P-polarized light components Pa, is converted into polarized light closest to linearly polarized light. In FIG. 8, the elliptically polarized light passes through the quarter wavelength plate 51 and converted into the linearly polarized light which vibrates in a direction that forms an angle θ1 to the vertical direction.

(2) The polarization plate 52 is provided such that its transmission axis is set in a direction perpendicular to a direction where polarized light converted by the quarter wavelength plate 51 vibrates. In FIG. 8, the direction of the transmission axis of the polarization plate 52 forms the angle θ1 to the horizontal direction and 90 degrees to the direction where the linearly polarized light vibrates.

The quarter wavelength plate 51 and the polarization plate 52 with the optical characteristics (1) and (2), respectively, achieve displaying of complete black with no lowering of contrast ratio when the liquid crystal display 31a is not active for modulation. Because the elliptical polarized light emitted from the color filter 33 is once converted into the linearly polarized light by the quarter wavelength plate 51, but the linearly polarized light is interrupted by the polarization plate 52 so that no light beam is generated to be projected.

When the liquid crystal display 31a is active for modulation, light emitted from the color filter 33 becomes elliptically polarized light that varies according to the modulation by liquid crystals. The elliptically polarized light passes through the quarter wavelength plate 51 as it is and is incident to the polarization plate 52 which allows only polarized light components that match the transmission axis of the polarization plate 52 to pass therethrough to be modulated light beams to be projected onto a screen.

Figure 9:
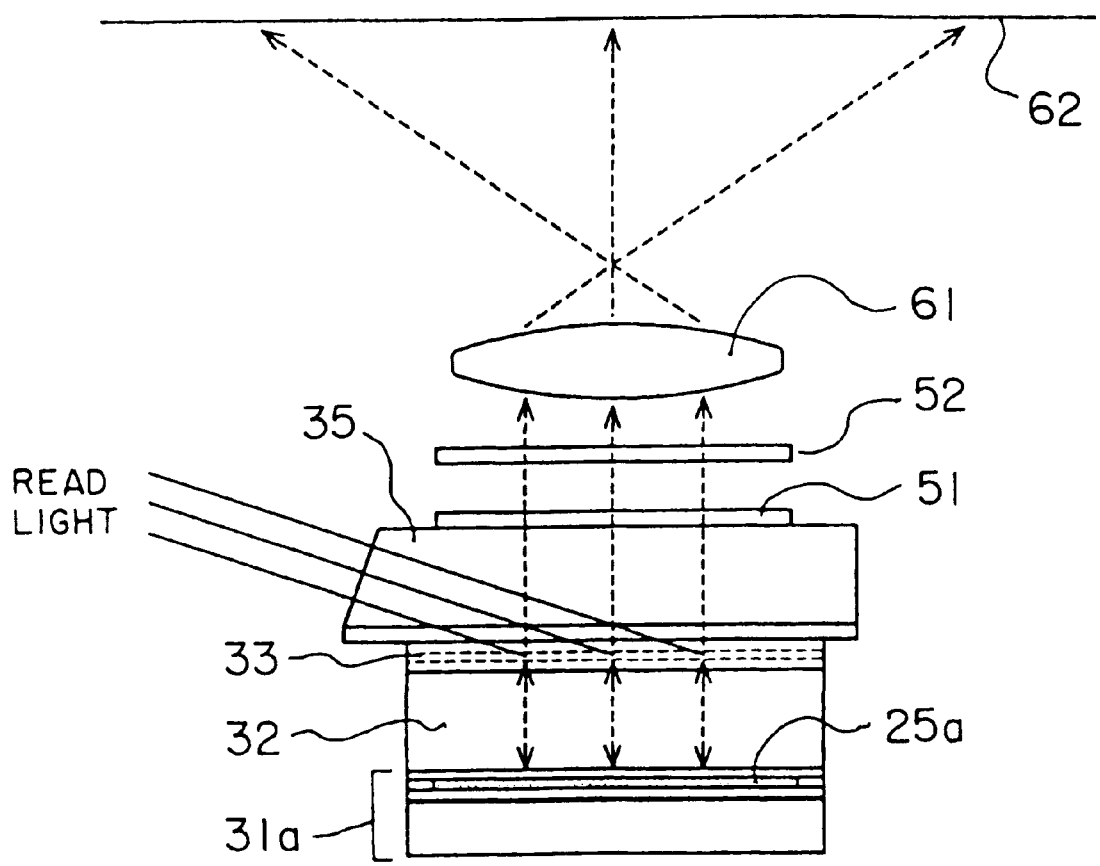
FIG. 9 is a sectional view of the first embodiment of the liquid crystal displaying apparatus shown in FIG. 8.

The first preferred embodiment according to the present invention will also be illustrated in FIG. 9.

The first embodiment shown in FIG. 9 is different from the conventional apparatus of FIG. 3 as follows:

The first embodiment employs the liquid crystal display 31a with vertical orientation-mode liquid crystals with a large pretilt angle. Furthermore, the first embodiment employs the quarter wavelength plate 51 (not the conventional polarization plate 36) provided on the coupling prism 35, and the polarization plate 52 provided over the quarter wavelength plate 51. The quarter wavelength plate 51 and the polarization plate 52 have the above-mentioned optical characteristics (1) and (2), respectively.

Therefore, in a normally black mode, the first embodiment can prevent displaying of incomplete black which would occur due to a large pretilt angle of the vertical orientation-mode liquid crystals when the liquid crystal display 31a is not active for modulation. An image projected on a screen 62 via a projection lens 61 will thus have high quality with sharp black.

Figure 4:
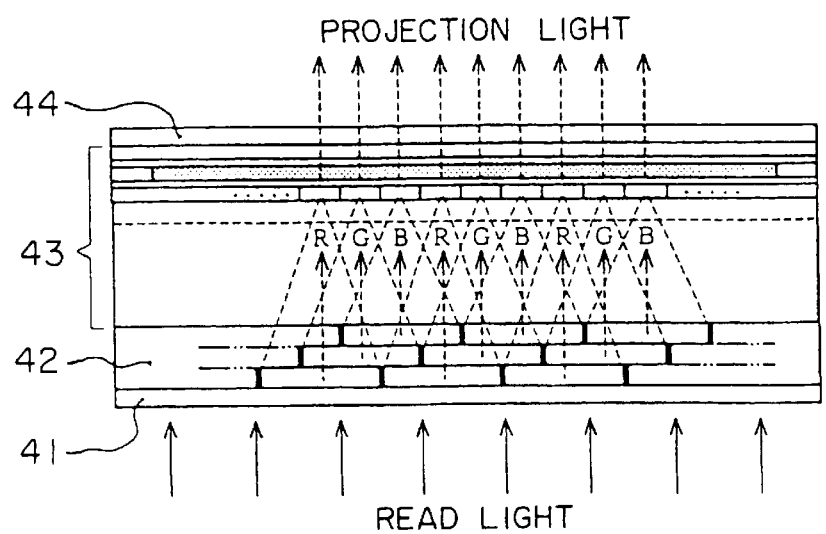
FIG. 4 is a cross sectional view of another conventional liquid crystal displaying apparatus.
Figure 5:
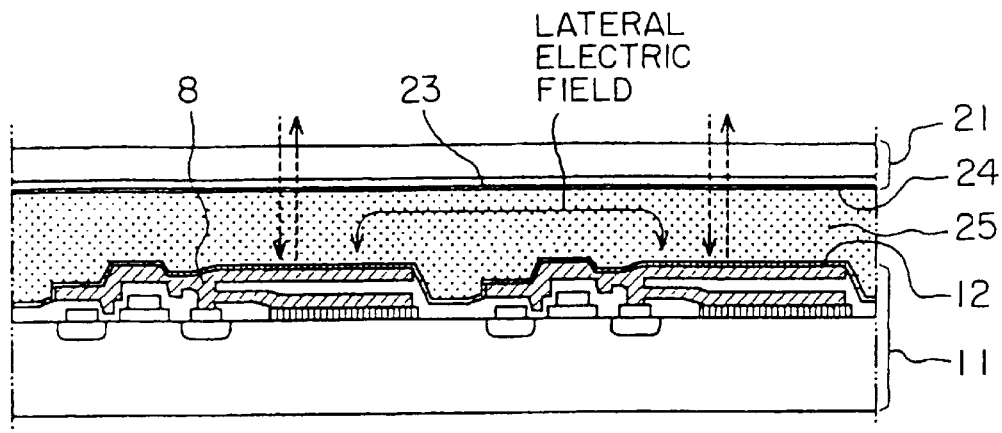
FIG. 5 illustrates occurrence of a lateral electric field.
Figure 6:
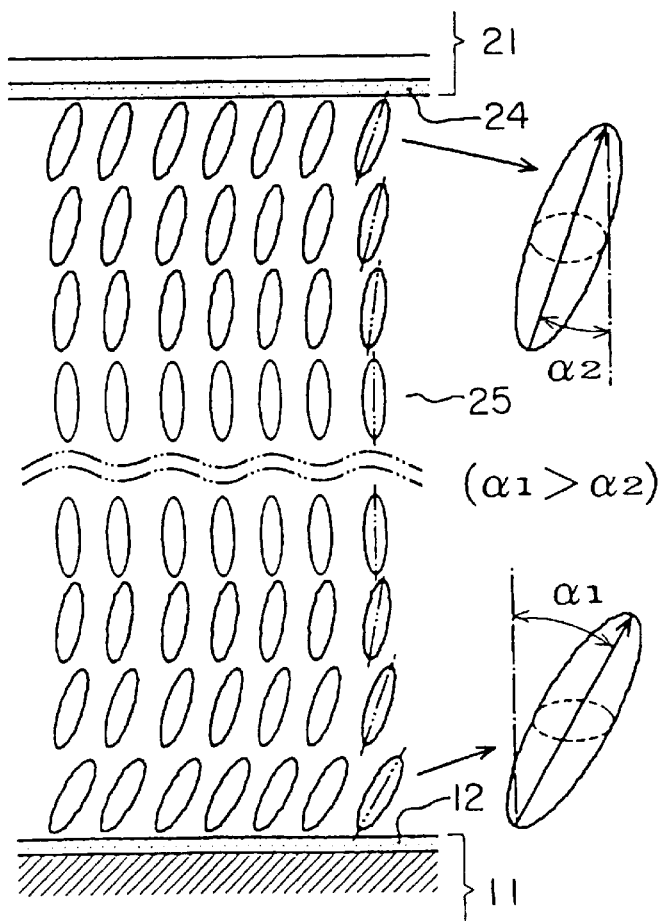
FIG. 6 illustrates a conventional method of preventing disclination occurred when vertical orientation-mode liquid crystals are employed.

Next, before describing the second embodiment, disadvantages of the other conventional apparatus shown in FIG. 4 will further be discussed.

Figure 10A:
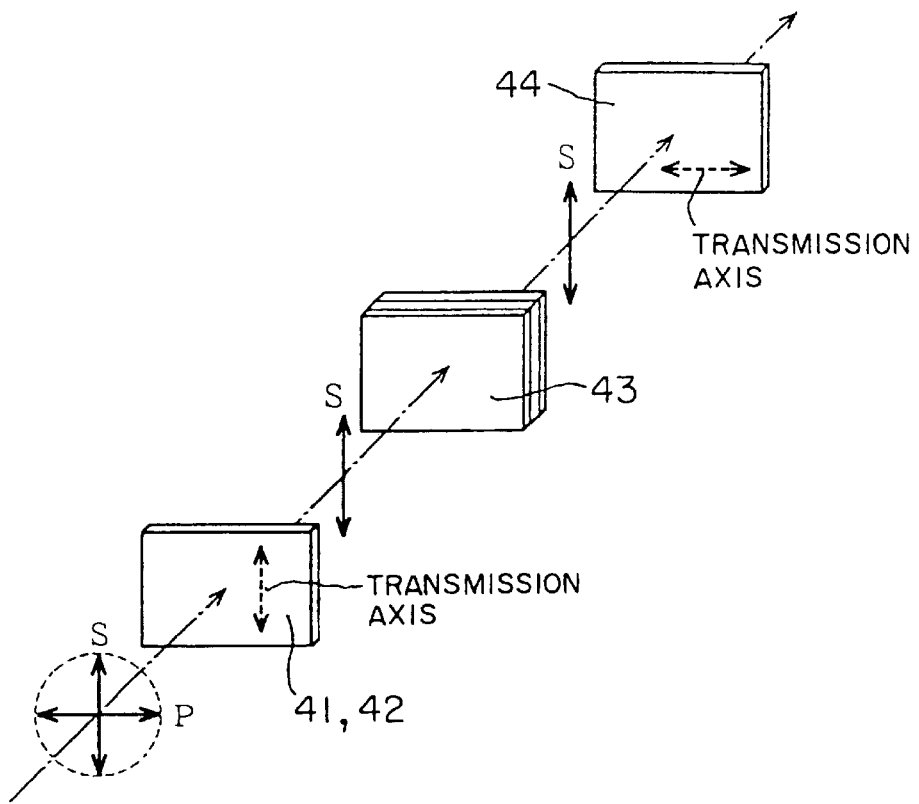
FIG. 10A illustrates an optical element arrangement in the apparatus shown in FIG. 4 where liquid crystals have a small pretilt angle.
Figure 10B:
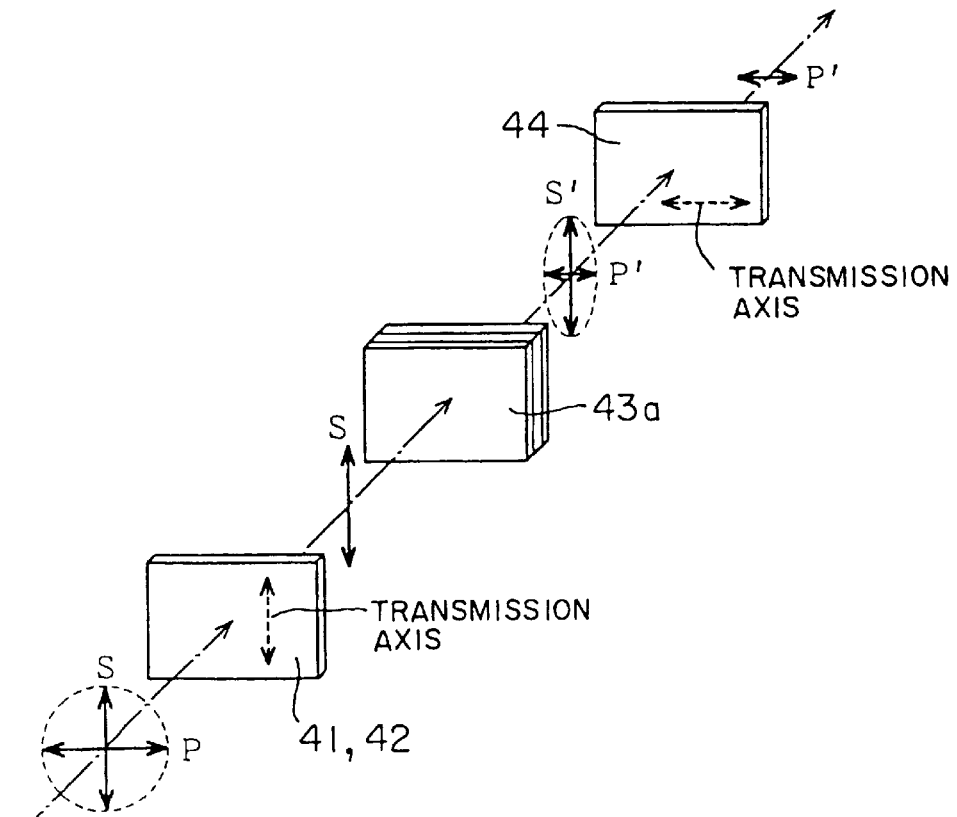
FIG. 10B illustrates another optical element arrangement in the apparatus shown in FIG. 4 where liquid crystals have a large pretilt angle.

FIGS. 10A and 10B illustrate optical element arrangements in the apparatus shown in FIG. 4, where optical paths in the transmission-type apparatus are made into straight, and the polarization plate 41 and the color filter 42 are illustrated as one optical element for brevity. FIG. 10A illustrates an arrangement having the liquid crystal display 43 with a small pretilt angle of liquid crystals. On the other hand, FIG. 10B illustrates another arrangement having a liquid crystal display 43a with a large pretilt angle for prevention of disclination which would occur due to a lateral electric field produced between pixel electrodes.

As shown in FIG. 10A, circularly polarized light (read light) beams are incident to the polarization plate 41 from a light source (not shown). Only S-polarized light components are diffracted by the color filter 42 and incident to the liquid crystal display 43. The S-polarized light components will pass through the liquid crystal display 43 when not active for modulation and are incident to the polarization plate 44 due to the small pretilt angle of the liquid crystals.

The S-polarized light components will, however, be interrupted by the polarization plate 44 and not become projection light beams. Because the polarization plate 44 is provided such that its transmission axis is set in the direction where only P-polarized light component are allowed to pass therethrough.

On the other hand as shown in FIG. 10B, the S-polarized light components incident to the liquid crystal display 43a with the large pretilt angle undergo double refraction and converted into small quantity of P-polarized light components P' and large quantity of S-polarized light components S', that is, the incident S-polarized light components are converted into elliptically polarized light components.

When the elliptically polarized light components are incident to the polarization plate 44, the S-polarized light components S' are interrupted, but the P-polarized light components P' pass therethrough, which will become steadily constant light beams to be projected on a screen (not shown). This will cause low contrast ratio because small quantity of P-polarized light components P' will be projected onto a screen even if the liquid crystal display 43a is not active for modulation.

The second preferred embodiment of a liquid crystal displaying apparatus according to the present invention will now be described.

Figure 11:
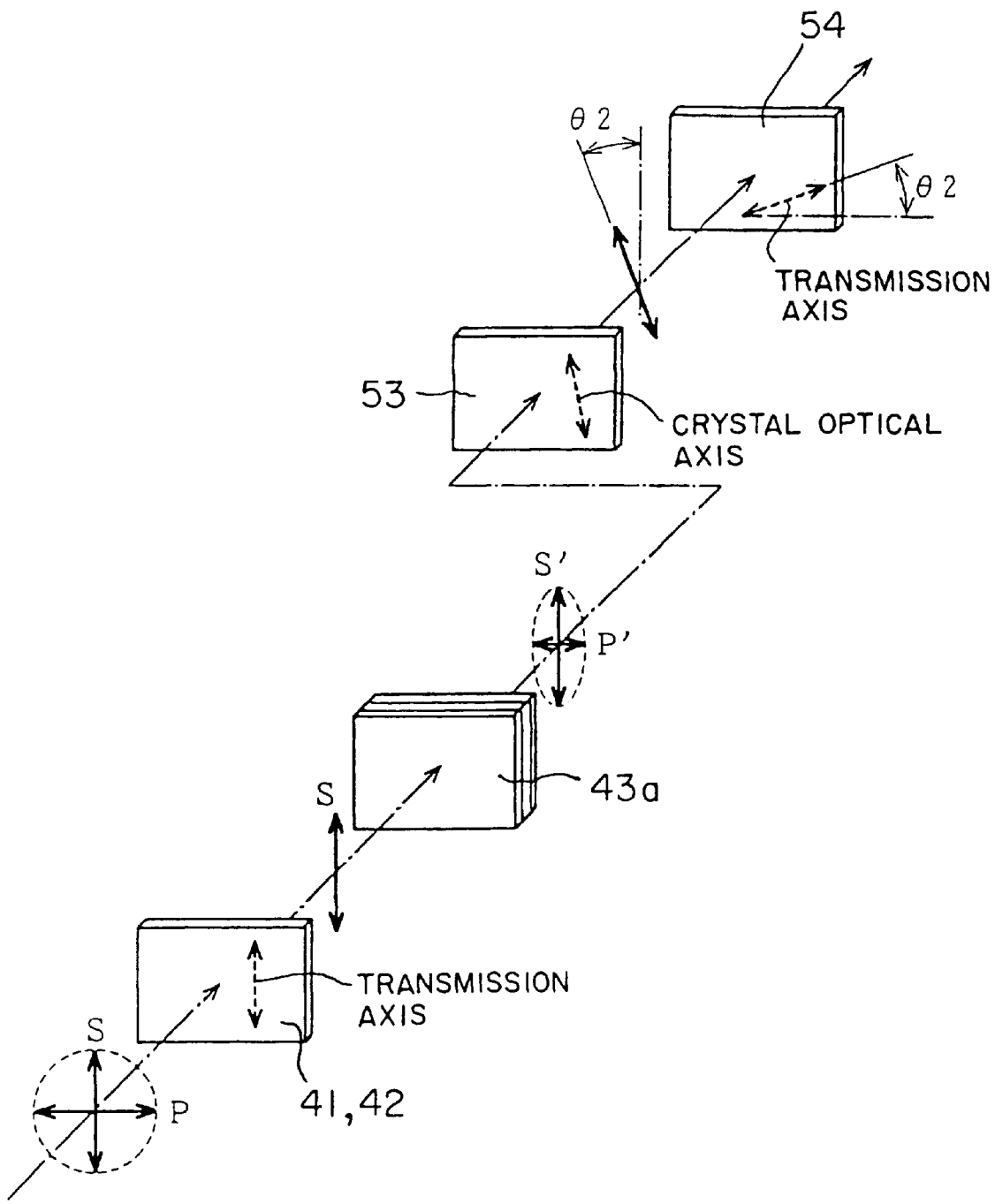
FIG. 11 illustrates the second embodiment of a liquid crystal picture displaying apparatus according to the invention.

As illustrated in FIG. 11, this embodiment is provided with a quarter wavelength plate 53 and a polarization plate 54 at the light emitting side of the liquid crystal display 43a without using the polarization plate 44. The quarter wavelength plate 53 and the polarization plate 54 have the optical characteristics (3) and (4) listed below, respectively, to prevent lowering of contrast ratio of image which would be caused due to existence of the liquid crystal display 43a with a large pretilt angle of liquid crystals.

(3) The quarter wavelength plate 53 is provided such that its optical axis is set in the direction where elliptically polarized light, a combination of S-polarized light components S' and P-polarized light components P', is converted into polarized light closest to linearly polarized light. In FIG. 11, the elliptically polarized light passes through the quarter wavelength plate 53 and converted into the linearly polarized light which vibrates in a direction that forms an angle θ2 to the vertical direction.

(4) The polarization plate 54 is provided such that its transmission axis is set in a direction perpendicular to a direction where polarized light converted by the quarter wavelength plate 53 vibrates. In FIG. 11, the direction of the transmission axis of the polarization plate 54 forms the angle θ2 to the horizontal direction and 90 degrees to the direction where the linearly polarized light vibrates.

The second embodiment can also prevent the P-polarized light components P' from being projection light beams the same as the first embodiment.

The second embodiment is, however, different from the first embodiment in that it is transmission-type and hence does not have such a function to allow most of the S-polarized light components to return to the light source side, which is achieved by the color filter 33 of the first embodiment. The liquid crystal display device 43a thus emits, when not active for modulation, large quantity of the S-polarized light components S', whereas, small quantity of the P-polarized light components P' due to the large pretilt angle of the liquid crystals. The elliptical polarized light, the combination of the large quantity of S-polarized light components S' and the small quantity of the P-polarized light components P', has extremely large ratio of its long axis to the short axis.

The quarter wavelength plate 53 and the polarization plate 54 with the optical characteristics (3) and (4), respectively, can prevent lowering of contrast ratio when the liquid crystal display 43a with the large pretilt angle is not active for modulation. Because the elliptical polarized light emitted from the liquid crystal display 43a is once converted into the linearly polarized light by the quarter wavelength plate 53, but the linearly polarized light is interrupted by the polarization plate 54 so that no light beam is generated to be projected.

When the liquid crystal display 43a is active for modulation, light emitted from the liquid crystal display 43a becomes elliptically polarized light that varies according to the modulation by liquid crystals. The elliptically polarized light passes through the quarter wavelength plate 53 as it is and is incident to the polarization plate 54 which allows only polarized light components that match the transmission axis of the polarization plate 54 to pass therethrough to be modulated light beams to be projected onto a screen.

The second preferred embodiment according to the present invention will also be illustrated in FIG. 12.

The second embodiment includes a light source 63, the polarization plate 41, the color filter 42, the liquid crystal display device 43a, the quarter wavelength plate 53, the polarization plate 54 and a projection lens 61', which are arranged on the optical axis in order. An image modulated by the liquid crystal display device 43a will be projected onto a screen 62'.

The second embodiment shown in FIG. 12 is different from the conventional apparatus of FIG. 4 as follows:

The second embodiment employs the liquid crystal display 43a with vertical orientation-mode liquid crystals with a large pretilt angle. Furthermore, the second embodiment employs the quarter wavelength plate 53 and the polarization plate 54 (not the conventional polarization plate 44). The quarter wavelength plate 53 and the polarization plate 54 have the above-mentioned optical characteristics (3) and (4), respectively.

Therefore, in a normally black mode, the second embodiment also can prevent displaying of incomplete black which would occur due to a large pretilt angle of the vertical orientation-mode liquid crystals when the liquid crystal display 43a is not active for modulation. An image projected on the screen 62' via the projection lens 61' will thus have high quality with sharp black.

As described above, the conventional reflection- or transmission-type liquid crystal displaying apparatus with vertical orientation-mode liquid crystals generate disclination due to the lateral electric field. A large pretilt angle of the liquid crystals for avoiding this problem causes large double refraction in the liquid crystals even when the liquid crystal display is not active for modulation. Polarized light components thus generated due to the double refraction become light beams to be projected. This causes lowering in contrast ratio.

The first and second embodiments employ the quarter wavelength plate and the polarization plate to prevent the polarized light components from becoming the projection light beams due to the double refraction. Therefore, the first and second embodiments can achieve an image projected on a screen of high quality with sharp black in a normally black mode.

The third preferred embodiment of a liquid crystal displaying apparatus according to the present invention will be described.

Figure 13:
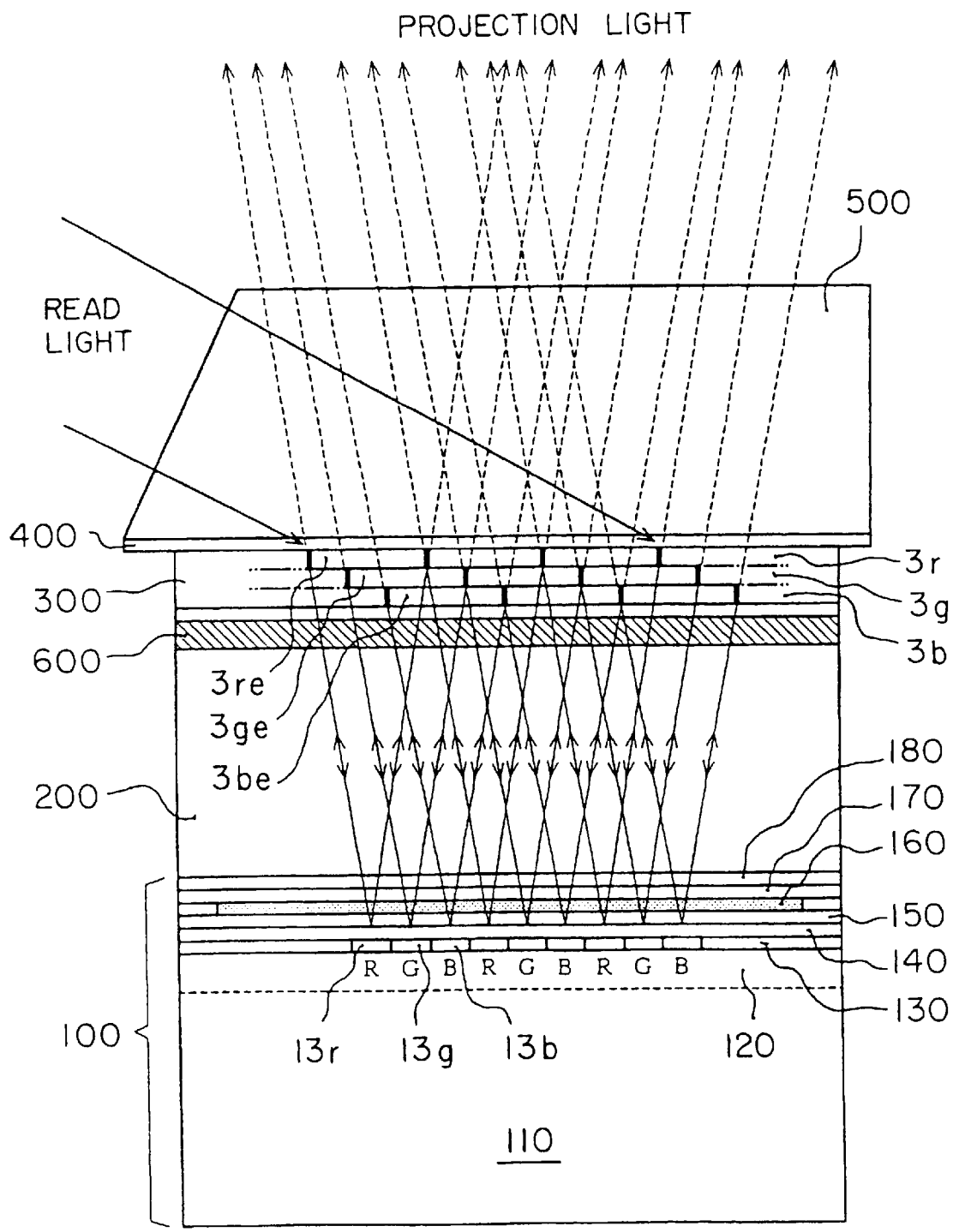
FIG. 13 illustrates the third embodiment of a liquid crystal picture displaying apparatus according to the invention.

The third embodiment is a reflection-type liquid crystal displaying apparatus. The apparatus includes, as shown in FIG. 13, a liquid crystal display 100, a thin plate glass layer 200, a half wavelength plate 160, a color filter 300, a glass substrate 400, and a coupling prism 500.

The elements other than the color filter 300 and the half wavelength plate 160 are analogous to those shown in FIG. 3 and hence explanation thereof are omitted.

The color filter 300 is made of a transmission type hologram formed into a holographic lens array. Read light beams including three primary colors of R, G and B incident to the color filter 300 are diffracted for each primary color and vertically focused onto corresponding pixel electrodes 13r, 13g and 13b of the liquid crystal display 100. In other words, the color filter 300 serves to allow main light beams to be incident substantially vertically to pixel electrodes 13r, 13g and 13b, and to focus the light beams thereon.

In detail, light beams are incident to a dielectric mirror film 140 implemented in the liquid crystal display 100. However, explanation will be given below on the assumption that light beams are focused onto the pixel electrodes 13r, 13g and 13b. Because the dielectric mirror film 140 is extremely thinner than the pixel electrodes 13r, 13g and 13b.

The transmission-type hologram has a three layer structure of a holographic lens array layer 3r for the color R, a holographic lens array layer 3g for the color G, and a holographic lens array layer 3b for the color B.

Holographic lens array layers 3r, 3g and 3b are composed of holographic lenses 3re, 3ge and 3be, respectively, corresponding to unit hologram, arranged horizontally in a planar fashion. The optical axes of the holographic lenses 3re, 3ge and 3be are positioned so that they go through substantially the central portions of the pixel electrodes 13r, 13g and 13b, respectively.

The holographic lenses 3re, 3ge and 3be are formed in a stripe to match the pixel electrodes 13r, 13g and 13b also formed in a stripe. In each holographic lens array layer, the holographic lenses are arranged with the same pitch as that of length and width of the corresponding pixel electrodes. However, when the stacked three layers are viewed in section, the holographic lenses 3re, 3ge and 3be are partially overlapped with each other, and the holographic lenses 3re, 3ge are 3be are arranged with the pitch of ⅓ with respect to the pitch of pixel electrodes for primary color.

The holographic lenses 3re, 3ge and 3be are made up so that their holograms serve to diffract S-polarized light components of wavelength band corresponding to primary colors.

The characteristics of the holographic lenses 3re, 3ge and 3be will be described with reference to FIG. 14.

Figure 14:
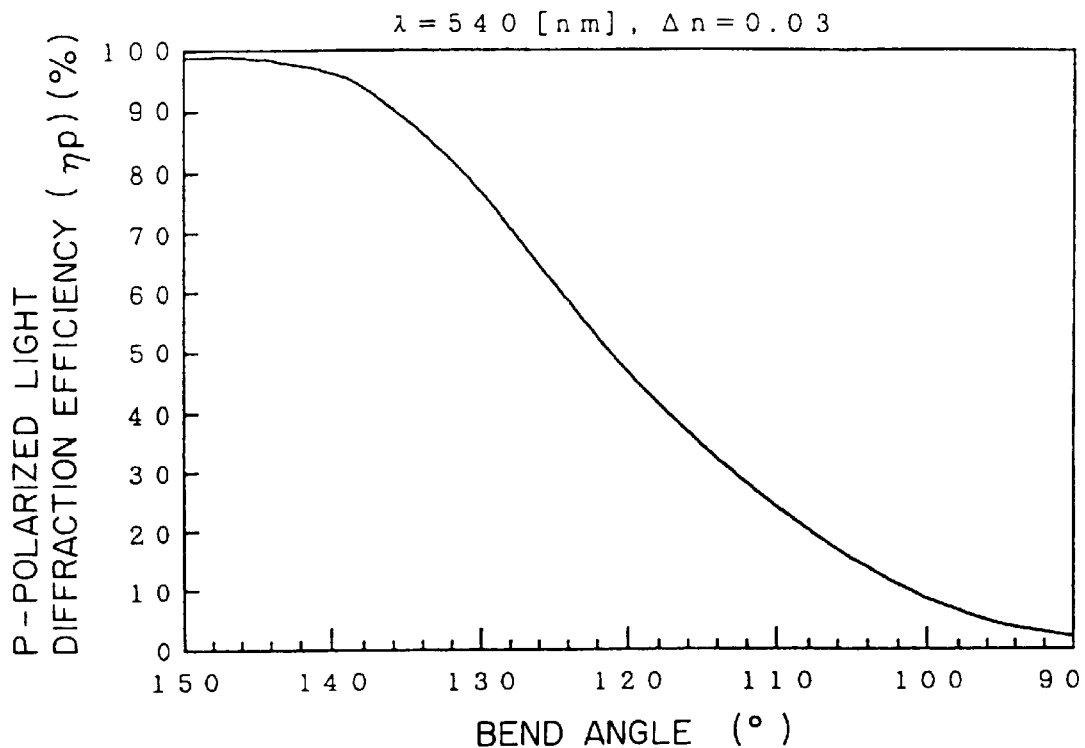
FIG. 14 is a graph showing change in diffraction efficiency $\eta s$ of P-polarized light components.

FIG. 14 shows diffraction efficiency of P-polarized light components calculated under the condition that a wavelength of an incident read light beam is 540 nm, a modulation quantity Δn of refractive index to holographic material is 0.03, and thickness of hologram "t" is varied so that diffraction efficiency of S-polarized light components is 100% to an angle (bend angle) between read light beam and diffracted light beam.

As understood from FIG. 14, when the bend angle is large, the both the S-polarized light components and the P-polarized light components are diffracted substantially by 100%. On the other hand, when the bend angle is 120° or less, the diffraction efficiency of the P-polarized light components is decreased to 50% or less. Furthermore, when the bend angle is almost 90°, the diffraction efficiency is almost 0%.

The diffraction efficiency greatly depends on wavelength of incident light beams. The dependency allows an optimum design in which the S-polarized light components are diffracted at diffraction efficiency close to 100% and the diffraction efficiency of the P-polarized light components is extremely small.

Accordingly, the color filter 300 is formed with the holographic lens array with the transmission-type holograms that diffract only S-polarized light components of wavelength bands corresponding to the primary colors R, G and B at higher diffraction efficiency and suppress efficiency in diffraction of P-polarized light components.

Figure 15:
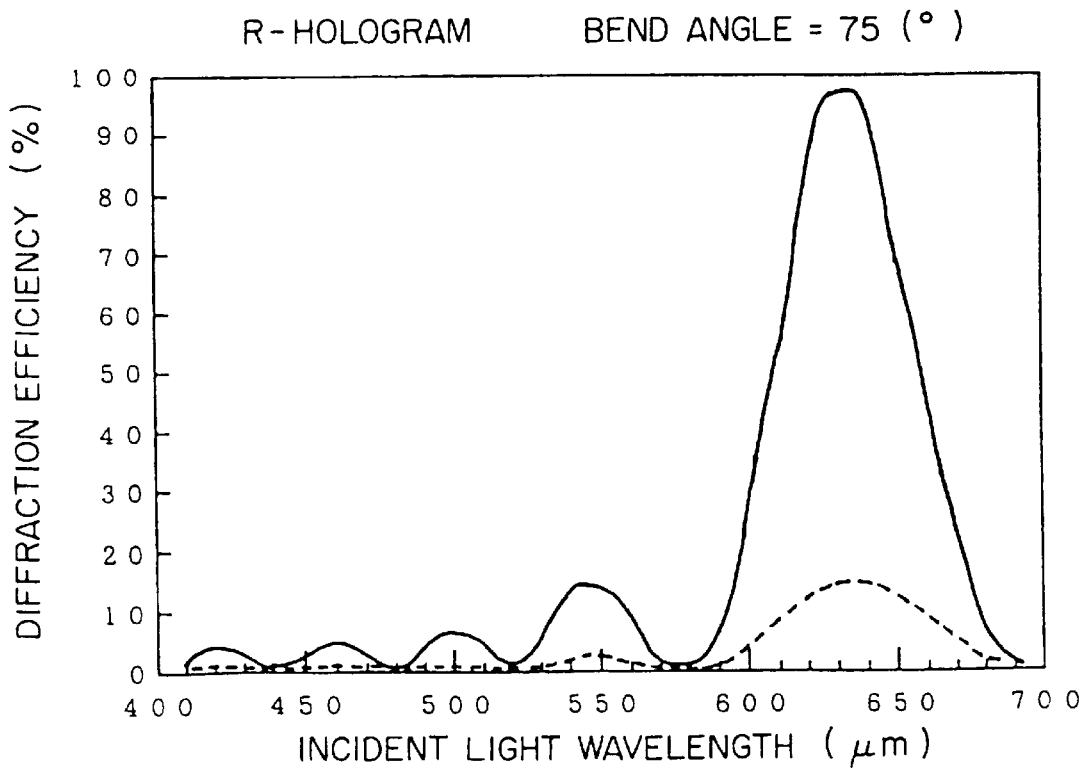
FIG. 15 is a graph showing diffraction efficiency characteristics of P- and S-polarized light components.
Figure 16:
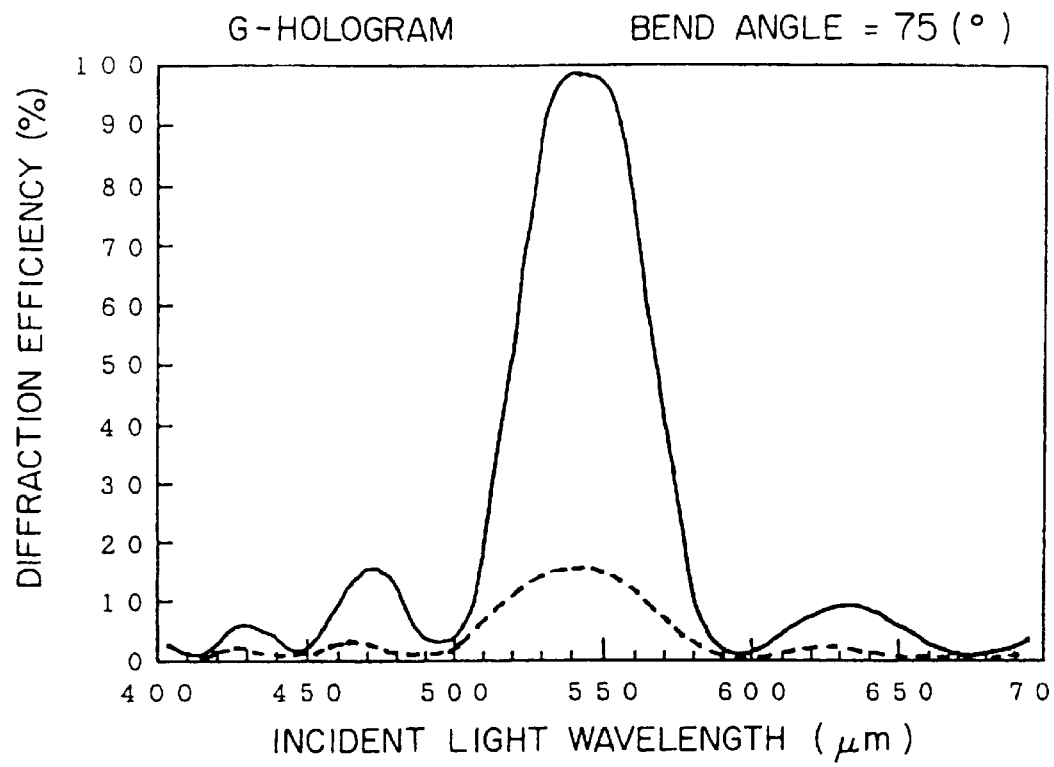
FIG. 16 is another graph showing diffraction efficiency characteristics of P- and S-polarized light components.
Figure 17:
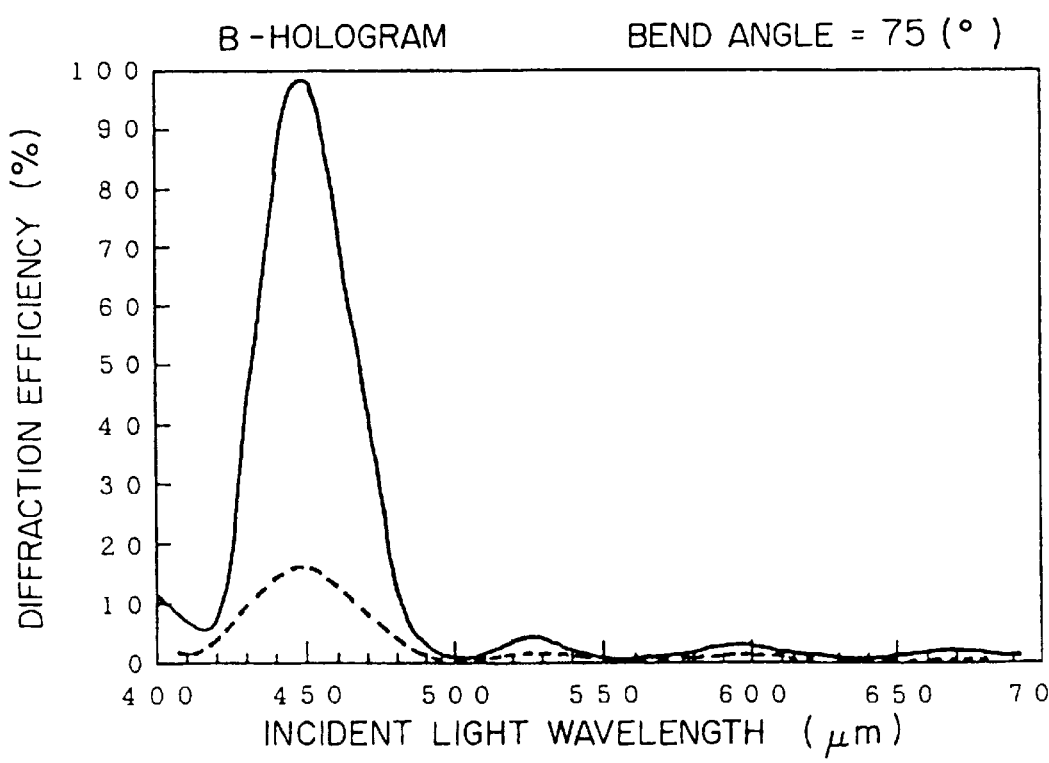
FIG. 17 is still another graph showing diffraction efficiency characteristics of P- and S-polarized light components.

FIGS. 15 to 17 show the relationship between diffraction efficiencies in the holograms for the primary colors R, G and B and wavelength of incident light beams based on the optimum design with a bend angle 75°.

In each figure, the solid line and broken line indicate S-polarized light components and P-polarized light components, respectively. As shown, about 100% diffraction efficiency can be obtained to the S-polarized light components, and the diffraction efficiency for P-polarized light components are suppressed to about 18% or less in the vicinity of center wavelength of each of the primary colors R, G and B.

In the color filter 300 using the holograms with the characteristics shown FIGS. 15 to 17, the holographic lenses 3re, 3ge and 3be diffract only S-polarized light components and emit them vertically to the corresponding pixel electrodes 13r, 13g and 13b when the read light incident angle θ to the color filter 300 is set to 75° (=180–105: bend angle=105°).

Instead of the holographic lens arrays 3r, 3g and 3b, the color filter 300 can be formed of single ship hologram sensitive material on which holographic lens arrays with wavelength dependency to diffraction efficiency. This type of color filter can be formed by computer holography without mechanical positioning.

An operation of the apparatus of FIG. 13 will be made first without the half wavelength plate 160 in order to discuss the disadvantages if the half wavelength plate 160 is not used.

In FIG. 13, read light beams radiated from a light source (not shown) is incident vertically to the incident surface of the coupling prism 500 via an optical system (not shown). The read light beams pass through the coupling prism 500 and also the glass substrate 400, and are incident to the color filter 300 at an angle 75°.

The read light beams incident to the color filter 300 are first diffracted by the holographic lens array layer 3r for the color R. Each holographic lens 3re of the array layer 3r serves to diffract only S-polarized light components of wavelength band for the color R, whereas serves to allow light components of other wavelength bands and P-polarized light components of wavelength band for the color R in the read light beams to pass therethrough.

In detail, each holographic lens 3re diffracts the S-polarized light components at diffraction efficiency of about 100% while suppressing diffraction efficiency to 20% for the P-polarized light components. The diffracted S-polarized light components and a small quantity of the P-polarized light components are thus focused onto the pixel electrode 13r of the liquid crystal display 100.

Each holography lens 3re makes light beams of S-polarized light components and the small quantity of P-polarized light components in the wavelength of the color R vertically incident to the holography lens array layer 3g for the color G. Furthermore, each holography lens 3re makes light components except for wavelength band of the color R and P-polarized light components of wavelength band of the color R which have not been diffracted to be incident to the holography lens array layer 3g while not changing the direction of read light beams.

Each holographic lens 3ge of the holography lens array layer 3g diffracts the S-polarized light components for the color G that have passed through the holography lens array layer 3r at diffraction efficiency of about 100% while suppressing diffraction efficiency to 20% for the P-polarized light components. The diffracted S-polarized light components and the small quantity of the P-polarized light components are thus focused onto the pixel electrode 13g of the liquid crystal display 100.

Light beams of S-polarized light components in wavelength band of the color R and the small quantity of P-polarized light component of that band vertically incident to the holography lens array layer 3g are incident to the holography lens array layer 3b for the color B as they are. Also incident in a traveling direction of read light to the holography lens array layer 3b are light components which have not been subjected to diffraction at the layer 3g. The light components are except for wavelength band of the colors R and G, P-polarized light components of wavelength band of the color R, and P-polarized light components of wavelength band of the color G which have not been diffracted.

Each holographic lens 3be of the holographic lens array layer 3b mainly diffracts S-polarized light components in a wavelength band for the color B. Each holographic lens 3be diffracts S-polarized light components that pass through the holographic lens array layers 3r and 3g at diffraction efficiency of 100% while suppressing diffraction efficiency of P-polarized light components to 20% or less. These light components are focused on to the pixel electrode 13b of the color G of the liquid crystal display 100.

On the other hand, light beams of the colors R and G vertically incident are emitted to the thin plate glass layer 200 as they are. Also emitted in traveling direction of read light to the thin plate glass layer 200 are light components which have not been subjected to diffraction at the two layers 3r and 3g. The light components are components except for wavelength band of the colors R, G and B, P-polarized light components of wavelength band of the colors R and G, and P-polarized light components of wavelength band of the color B which have not been diffracted.

As described above, light components emitted from the color filter 300 are:

(1) light components of S-polarized light components of wavelength band of the color R and small quantities of P-polarized light components of each band, to be focused onto the pixel electrode 13r;

(2) light components of S-polarized light components of wavelength band of the color G and small quantities of P-polarized light components of each band, to be focused onto the pixel electrode 13g;

(3) light components of S-polarized light components of wavelength band of the color B and small quantities of P-polarized light components of each band, to be focused onto the pixel electrode 13b; and (4) zero-th order light of components except wavelength band of each color and P-polarized light components of wavelength band of each color.

When the light components (1) to (3) are incident to the liquid crystal display 100 via the thin plate glass layer 200, they are focused onto the corresponding pixel electrodes 13r, 13g and 13b of a pixel electrode layer 130 via a common electrode film 180, an orientation film 170, a light modulating layer 160 and an orientation film 150. The light components are then reflected by a dielectric mirror film 140 and become divergent light beams. The divergent light re-enter the corresponding holographic lenses 3re, 3ge and 3be of the color filter 300.

Control voltages corresponding to a video signal for one pixel are applied to the pixel electrodes 13r, 13g and 13b from an active matrix drive circuit 120. The liquid crystals of the light modulating layer 160 changes their orientation due to potentials across the common electrode film 180 and the pixel electrodes 13r, 13g and 13b. The S-polarized light components of (1) to (3) are modulated according to the control voltages while reciprocating between the color filter 300 and the liquid crystal display 100, and re-enter the holography lenses 3re, 3ge and 3be. In other words, when the S-polarized light components undergo modulation of X%, polarized light of (100-X)% remains unchanged, but polarized light of X% are converted into P-polarized components. The P-polarized components re-enter the holography lenses 3re, 3ge and 3be.

Figure 18:
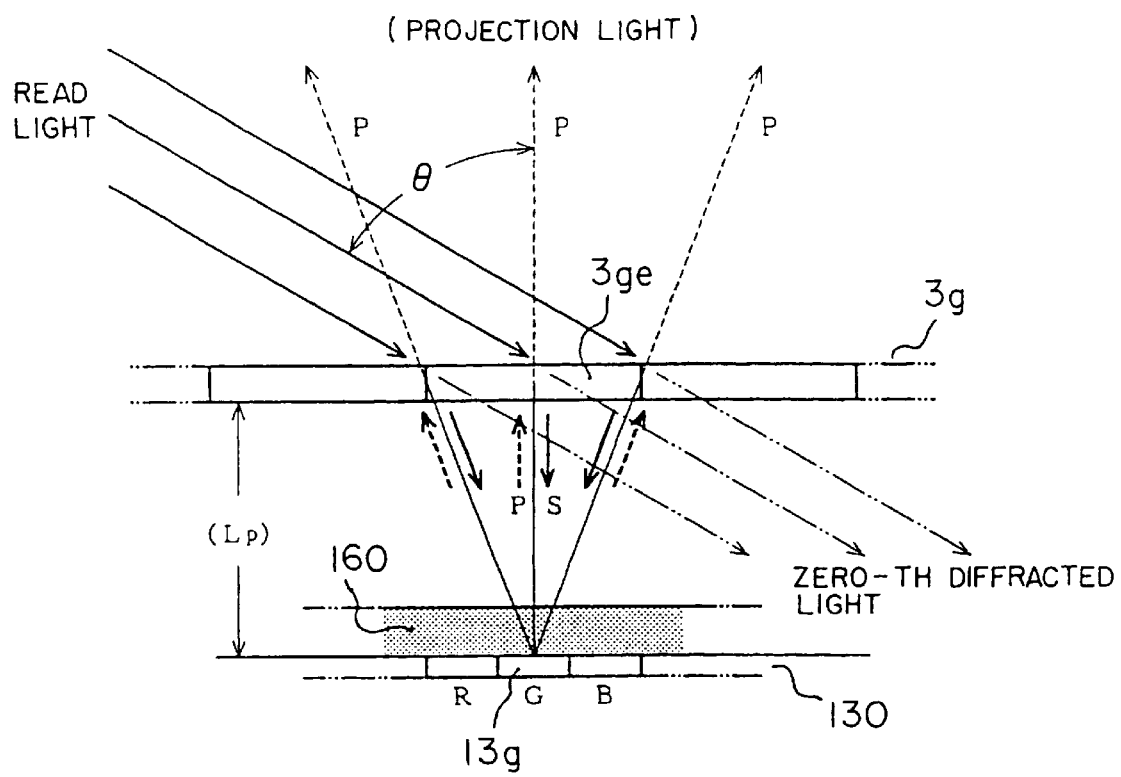
FIG. 18 illustrates modulation of S-polarized light components of wavelength band of the color G.

The above state is illustrated in FIG. 18 with respect to the S-polarized light components of wavelength band of the color G.

The S-polarized light components diffracted by the holographic lens 3ge are focused onto substantially the center of the pixel electrode 13g positioned on the optical axis of that lens. When the S-polarized light components are modulated by the liquid crystals of the light modulating layer 160, a portion or all the S-polarized light components is converted into the P-polarized light components and incident to the holography lens 3ge. In detail, the modulated P-polarized light components are incident to the holography lens 3ge through the optical path having the symmetrical relationship with incident optical path to the pixel electrode 13g with respect to the optical axis.

FIG. 18 illustrates large incident and reflection angles to the pixel electrode 13g. However, the angles are actually extremely small because the holography lens 3ge is very small.

As described above, the holography lens 3ge serves to diffract S-polarized light components at diffraction efficiency of substantially 100% and P-polarized light components at diffraction efficiency of about 20% and focus the diffracted light components onto substantially the center of the pixel electrode 13g.

Accordingly, the light components of 20% of re-entering P-polarized light components after modulation are diffracted by the holographic lens 3ge on the basis of the rule of light reversing and return in the direction of read light, while other P-polarized light components pass through the holography lens 3ge.

On the other hand, most of the S-polarized light components remaining in non-modulated state corresponding to degree of modulation, and S-polarized light components which are modulated light of P-polarized light components which are the resultant of read light beams diffracted by the color filter 3 return in the direction of read light on the basis of the diffraction characteristic of the color filter 300 and the rule of light reversing.

The above-mentioned action is true for the colors R and G.

As a result, the P-polarized light components for the primary colors obtained by modulation pass through the color filter 300 as they are. As shown in FIG. 13, the P-polarized light components further pass through the coupling prism 500 via the glass substrate 400 and are emitted from its emitting surface. The emitted modulated light beams are projected onto a screen via a projection optical system (not shown).

The zero-th order light (4) is traveled through the thin plate glass layer 200, and is incident to the liquid crystal display 100 at an incident angle 75° which is the same as the incident angle of read light. The incident light is reflected at a reflection angle 75° by the dielectric mirror film 140, and reflected light is re-enter the color filter 300 at an incident angle of −75°. The re-entered zero-th order light is transmitted through the color filter 300 and is passed through the coupling prism 500 from the glass substrate 400, and emitted from the end surface of coupling prism 500 opposite to the surface to which the read light is incident.

As described above, by using the color filter with wavelength dependency of diffraction efficiency by hologram, polarization selectivity and light focusing function, a compact projection-type color picture displaying apparatus is achieved with high light utilization.

However, diffraction per pixel with dense-arranged pixel electrodes while obtaining display characteristic with high luminance and resolution, will generate a lateral electric field based on potential differences across the pixels of the pixel electrode layer. This causes disclination in the liquid crystals to lower image quality.

The lateral electric field causes lowering of luminance of pure color and deterioration in balance of each complementary color relationship, particularly, in stripe or mosaic pixel electrode arrangement where pixel electrodes for different colors are adjacent to each other.

In detail, the projection-type color displaying apparatus uses vertically oriented-mode liquid crystals in order to greatly vary contrast ratio against voltages applied to pixel electrodes.

Figure 19:
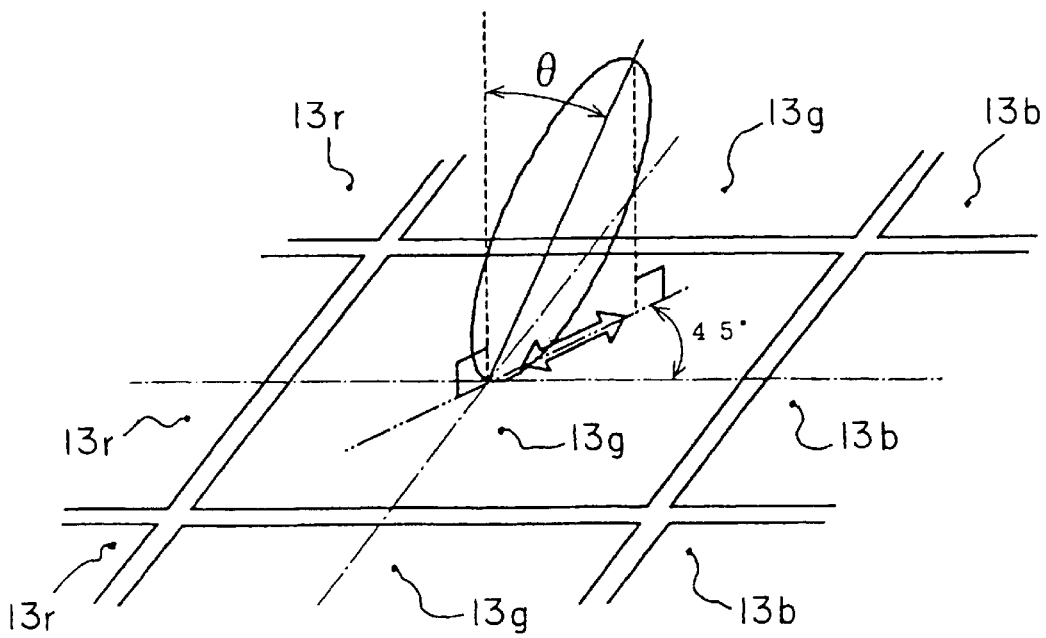
FIG. 19 illustrates the relationship between a pixel electrode arrangement a direction of orientation of liquid crystal molecules.

FIG. 19 illustrates the pixel electrodes 13r, 13g and 13b arranged in a stripe. An orientation direction given by the pretilt angle $\theta$ is set so that a projected mapping image to the pixel electrode layer in the orientation direction and a direction of pixel electrode arrangement form angle of 45°. In addition, polarized light is made incident to the liquid crystal layer so that a direction of its polarization plane and a projected mapped image in the orientation direction form an angle of 45° to achieve the maximum modulation efficiency in polarization at the liquid crystal layer.

Liquid crystal molecules are oriented at the pretilt angle $\theta$ when no voltage is applied to the pixel electrodes (off state), whereas they are inclined greatly in the orientation direction when voltages are applied (on state). Optical anisotropy based on the orientation change provides light modulation function to rotate polarization plane of light by 90° at the maximum.

Suppose that the pixel electrode 13g for the color G is on and the pixel electrodes 13r and 13b for the colors R and B, respectively, are off as shown in FIG. 20(A). This would produce a lateral electric field across the pixel electrodes 13g, and the pixel electrodes 13r and 13b. This causes abnormal inclination of liquid crystal molecules to the applied voltage in both side areas of the pixel electrode 13g. In other words, liquid crystal molecules tend to rise in the vertical direction at the pixel electrode 13r side, whereas to fall greatly more than required at the pixel electrode 13b side.

As a result, polarized light with polarization plane in the direction of G color stripe is incident to the pixel electrode 13g. When light reflected at that electrode surface is detected by an analyzer, as shown in FIG. 20(C), light intensity is lowered greatly in the area of the pixel electrode 13r side with lower pure color luminance of the color G and also off-balance in complementary colors between the colors R and G.

The third embodiment thus has the following two features to solve the problems discussed above.

The first feature of this embodiment resides in that an orientation direction of the liquid crystals constituting the light modulating layer 160 is set so that a direction in which a mapping image projected onto the pixel electrode layer 130 in the orientation direction matches a direction of alignment of the pixel electrodes for the same color.

In detail, the orientation direction of the liquid crystals is set by giving a pretilt angle to the liquid crystal molecules in advance by rubbing the orientation films 140 and 160. In this embodiment, the direction in which an inclination direction of the liquid crystal molecules given by the pretilt angle is projected onto the pixel electrode layer 130 is perpendicular to the drawing surface in FIG. 13, and further matches the direction of alignment of the pixel electrodes of R, G and B.

The second feature of this embodiment resides in that the half wavelength plate 600 is interposed between the color filter 300 and the thin plate glass layer 200. And, the crystal optical axis of the half wavelength plate 600 is set in a direction to take an angle of substantially 22.5° to a direction of alignment in pixel electrode to the same color. The half wavelength plate 600 is made of a wavelength film, a mica plate, or crystal plate, and so on, with a function of double refraction.

Like shown in FIG. 20(A), suppose that the pixel electrode 13g is ON, whereas the pixel electrodes 13r and 13b are OFF in the pixel electrode area of 3×3 pixels. The liquid crystals would be reoriented as shown in FIGS. 21(A) to 21(C).

FIG. 21(A) illustrates the arrangement of the pixel electrodes 13r, 13g and 13b, and also indicates directions of orientation of the liquid crystals projected onto the pixel electrode layer 130. FIG. 21(B) illustrates orientation of the liquid crystals at the pixel electrodes 13r and 13b, viewed from arrows H2—H2 in FIG. 21(A). And, FIG. 21(C) illustrates orientation of the liquid crystals at the pixel electrode 13g, viewed from arrows H—H1 in FIG. 21(A).

As shown in FIGS. 21(B), the liquid crystal molecules on the upper side of pixel electrodes 13r and 13b placed in OFF are maintained in the state where they are inclined in the orientation direction by several degrees to the vertical direction at the pretilt angle as it is. On the other hand, as shown in FIG. 21(C), the liquid crystal molecules on the upper side of the pixel electrode 13g placed ON are greatly inclined due to an electric field corresponding to a color pixel signal applied thereto.

The orientation produces a lateral electric field, by potential difference, across the pixel electrodes 13r and 13b, and the pixel electrode 13g. The disclination would be induced in the liquid crystals by the lateral electric field as shown in FIG. 20 if the third embodiment has not the above two features. However, thanks to the features, the liquid crystal molecules on the upper side of pixel electrode 13g hardly undergo the influence of the lateral electric field. As shown in FIG. 21(D) corresponding to the cross section indicated by arrows V—V in FIG. 21(A), the liquid crystal molecules are greatly inclined in the direction of alignment of the pixel electrode 13g over the entire area of the pixel electrode 13g. No disclination is generated in the liquid crystals.

Thanks to the first feature, the orientation direction of the liquid crystals is perpendicular to the direction of lateral electric field so that the liquid crystal molecules are hardly undergo the influence of the lateral electric field produced across the pixel electrodes of different colors. Thus, disclination can be effectively suppressed.

When light reflected on the electrode surface of the pixel electrode 13g is detected by an analyzer like shown in FIG. 20(C), its light intensity is as shown in FIG. 21(E) where lowering of luminance of pure color and off-balance of complementary color relationship can be prevented.

The liquid crystal molecules quickly respond to the lateral electric field generated in the orientation direction. Thus, when adjacent pixel electrodes for the same color are ON and OFF, disclination would occur by the lateral electric field generated thereacross. However, since such disclination would occur between the same color, it does not affect luminance of pure color and balance of complementary color relationship.

The change in polarization of light occurred from entrance to emission in the apparatus of this embodiment will now be described with reference to FIG. 22. Each thick solid line arrow indicates a direction of polarization plane of polarized light, each thick dotted line indicates a direction of crystal optical axis of the half wavelength plate 600, and each thick white arrow indicates a direction where the reorientation direction of the liquid crystals is projected onto the pixel electrodes.

The color filter 300 focuses S-polarized light components obtained by diffracting read light beams onto the pixel electrodes for corresponding colors via the half wavelength plate 600 and the optical modulation layer 160. As shown in FIG. 22(A), the polarization plane of the S-polarized light components of light diffracted by the color filter 300 is placed in the direction of alignment of pixel electrodes for the same color.

While passing through the half wavelength plate 600, the polarization plane of the S-polarized light components has an angle of substantially 22.5° to the direction of crystal optical axis 6a of the half wavelength plate 600 at the time of entrance as shown in FIG. 22(B). The polarization plane is thus rotated by substantially 45° as shown in FIG. 22(C) after passing through the half wavelength plate 600. Then, as shown in FIG. 22(D), the S-polarized light components are incident to the liquid crystals of the light modulating layer 160 with the polarization plane at an angle of substantially 45° to the direction of alignment of the pixel electrodes for the same color.

Accordingly, the polarization plane of the polarized light components incident to the pixel electrode layer 130 takes an angle of substantially 45° to the direction where the orientation direction of the liquid crystals is projected onto the pixel electrode. And, the incident polarized light components have the angular relationship that the maximum modulating efficiency can be obtained by the liquid crystals of the light modulating layer 160.

The polarized light incident to the light modulating layer 160 is modulated according to the voltages applied to the pixel electrodes in the process passing through the route of liquid crystal layer→(reflection at the pixel electrodes)→liquid crystal layer as shown in FIGS. 22(D) and 22(E), and re-enters the half wavelength plate 600 as shown in FIG. 22(F).

The polarization plane of polarized light is rotated by 90° due to modulation while reciprocating the liquid crystal layer 160, and, the polarized light is incident to the half wavelength plate 600 as shown in FIGS. 22(E) and 22(F). Liquid crystal optical axis 6a of the half wavelength plate 600 has an angle of substantially 67.5° to the polarization plane of the polarized light as shown in FIG. 22(F). The polarized light components after passing through the half wavelength plate 600 are rotated by substantially 135° and incident to the color filter 300 as shown in FIG. 22(G).

The polarized light components incident to the color filter 300 are P-polarized light components the polarization plane of which is perpendicular to the polarization plane of the S-polarized light components obtained by diffracting the read light beams as shown in FIG. 22(G). The modulated P-polarized light components pass through the color filter 300 as they are because the color filter 300 exhibits polarization selectivity for efficiently diffracting the S-polarized light components only.

The P-polarized light components passed through the color filter 300 can be used as modulated projecting light beams. On the other hand, the polarized light components which re-enter the color filter 300 without modulation remain unchanged as the S-polarized light components, they return in the direction where the read light beams enter on the basis of the diffraction characteristic of the color filter 300.

As discussed above, the half wavelength plate 600 is capable of preventing disclination with the liquid crystals the orientation direction of which is set according to the first feature. Further, the half wavelength plate 600 serves to rotate the polarization plane of the S-polarized light components diffracted by the color filter 300 so that they undergo modulation most efficiently by the liquid crystal layer, and to allow the modulated polarized light components to pass through the color filter 300 as P-polarized light components.

Next, the fourth preferred embodiment of a liquid crystal displaying apparatus according to the present invention will be described.

Figure 23:
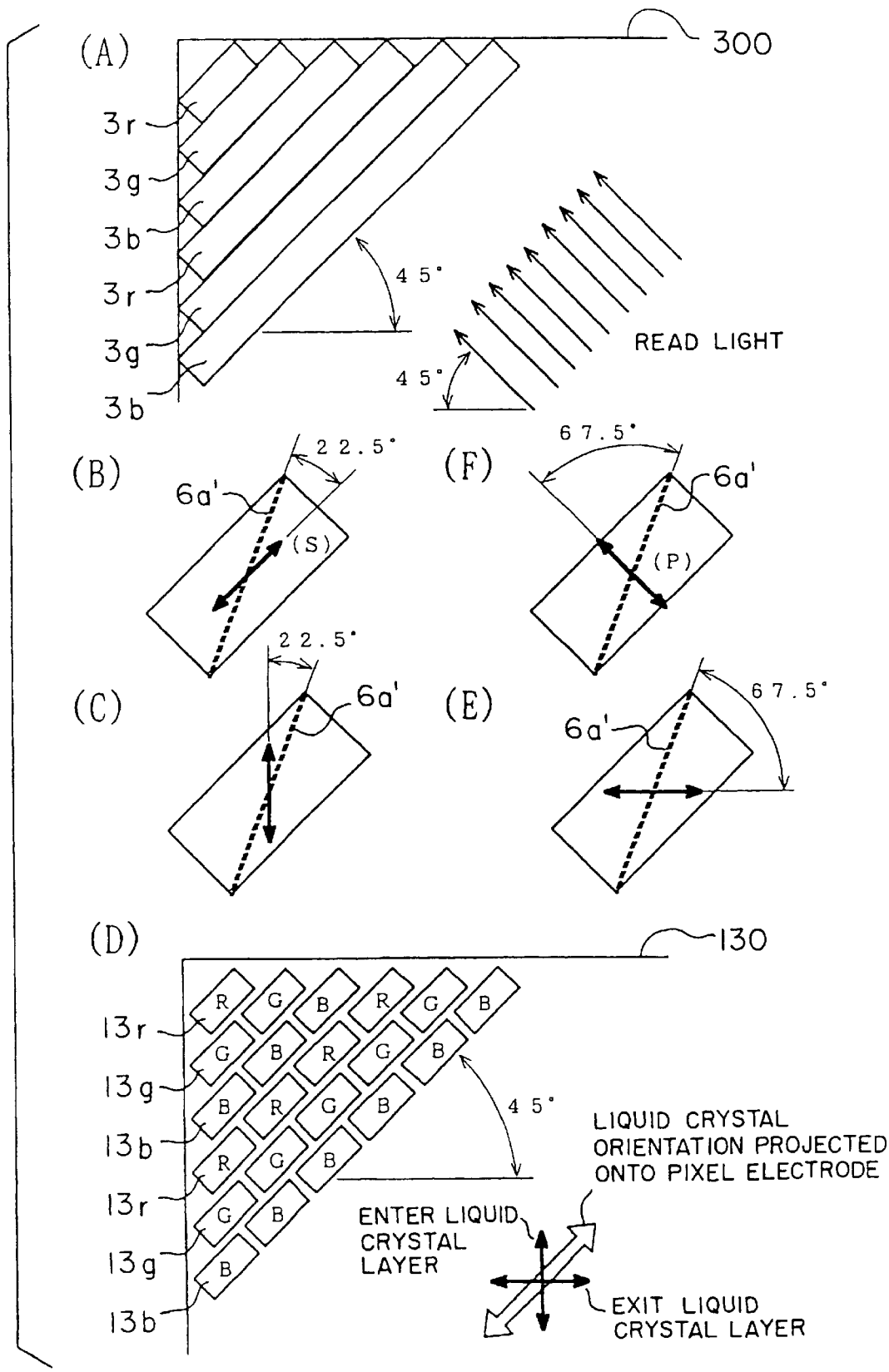
FIG. 23 illustrates the fourth embodiment of a liquid crystal picture displaying apparatus according to the invention.

The fundamental structure of the fourth embodiment is the same as the first embodiment. And, hence only the elements featured in the fourth embodiment are illustrated in FIG. 23.

The features of this embodiment are:

(1) a rectangular and flat color filter 300 has, as shown in FIG. 23(A), holographic lens array layers 3r, 3g and 3b for the primary colors R, G and B, respectively, are juxtaposed in a stripe with an inclination angle of substantially 45° to the longitudinal side and the lateral side of the rectangular;

(2) a rectangular and flat pixel electrode layer 130 has, as shown in FIG. 23(D), pixel electrodes for the same color aligned with an inclination angle of substantially 45° to the longitudinal side and the lateral side of the rectangular to match the color filter 300;

(3) the direction of orientation of the liquid crystals constituting the light modulating layer 160 is set so that the direction of mapped image in which the orientation direction is projected onto the pixel electrode layer 130 matches the direction of alignment of the pixel electrodes described in (2); and (4) a half wavelength plate like the one in FIG. 13 is employed, and, as shown in FIGS. 23(B), 23(C), 23(E) and 23(F), its crystal optical axis 6a' is set so as to take an angle of substantially 22.5° to the direction of alignment of pixel electrodes for the same color.

Thus, an image of pseudo mosaic arrangement can be displayed with a combination of the color filter 300 described in (1) and the pixel electrode layer 130 in (2).

The fourth embodiment allows: the read light beams to be incident from a direction perpendicular to a direction of juxtaposition of the holographic lens array layers 3r, 3g and 3b in the color filter 300; and like the third embodiment, the read light components are diffracted by the holographic lenses 3re, 3ge and 3be of the holographic array layers 3r, 3g and 3b, respectively, the resultant S-polarized light components being focused onto the pixel electrodes 13r, 13g and 13b of the pixel electrode layer 130.

The S-polarized light components diffracted by the color filter 300 are incident to the half wavelength plate where the polarization plane of the S-polarized light components takes an angle of substantially 22.5° to the crystal optical axis 6a' of the half wavelength plate as shown in FIG. 23(B). The S-polarized light components then pass through the half wavelength plate, the resultant polarized light components with the polarization plane rotated by substantially 45° being incident to the liquid crystals of the light modulation layer 160 as shown in FIG. 23(C).

Accordingly, like the third embodiment, polarized light incident to the liquid crystal undergoes modulation most efficiently at the liquid crystal layer. In addition, thanks to the orientation direction of the liquid crystal as described in the feature (3), even if a lateral electric field is produced across pixel electrodes for different colors, disclination in the liquid crystals can be suppressed. Thus, lowering of luminance of pure color and off-balance of complementary color relationship can be prevented.

On the other hand, the polarized light modulated through the route of liquid crystal layer→(reflection at the pixel electrodes)→liquid crystal layer re-enter the half wavelength plate while its polarization plane being rotated by substantially 90° as shown FIGS. 23(D) and 23(E). The polarization plane at that stage takes an angle of substantially 67.5° to the crystal optical axis 6a' of the half wavelength plate as shown in FIG. 23(E). The polarized light thus obtained passes through the half wavelength plate so that its polarization plane is rotated by 135°, and re-enters the color filter 300.

As a result, like the third embodiment, the modulated polarized light re-entering the color filter 300 becomes P-polarized light components. The P-polarized light components pass through the color filter 300 without diffraction, and become projection light beams. On the other hand, non-modulated S-polarized light components re-enter the color filter 300, and resultant diffracted polarized light components return in the direction of the read light beams.

In addition, like the third embodiment, projection light beams provides a color image of pseudo mosaic arrangement.

Next, the fifth preferred embodiment of a liquid crystal displaying apparatus according to the present invention will be described.

The fifth embodiment is a transmission-type color displaying apparatus with the color filter 300 and the half wavelength plate 600 used in the third embodiment.

Figure 24:
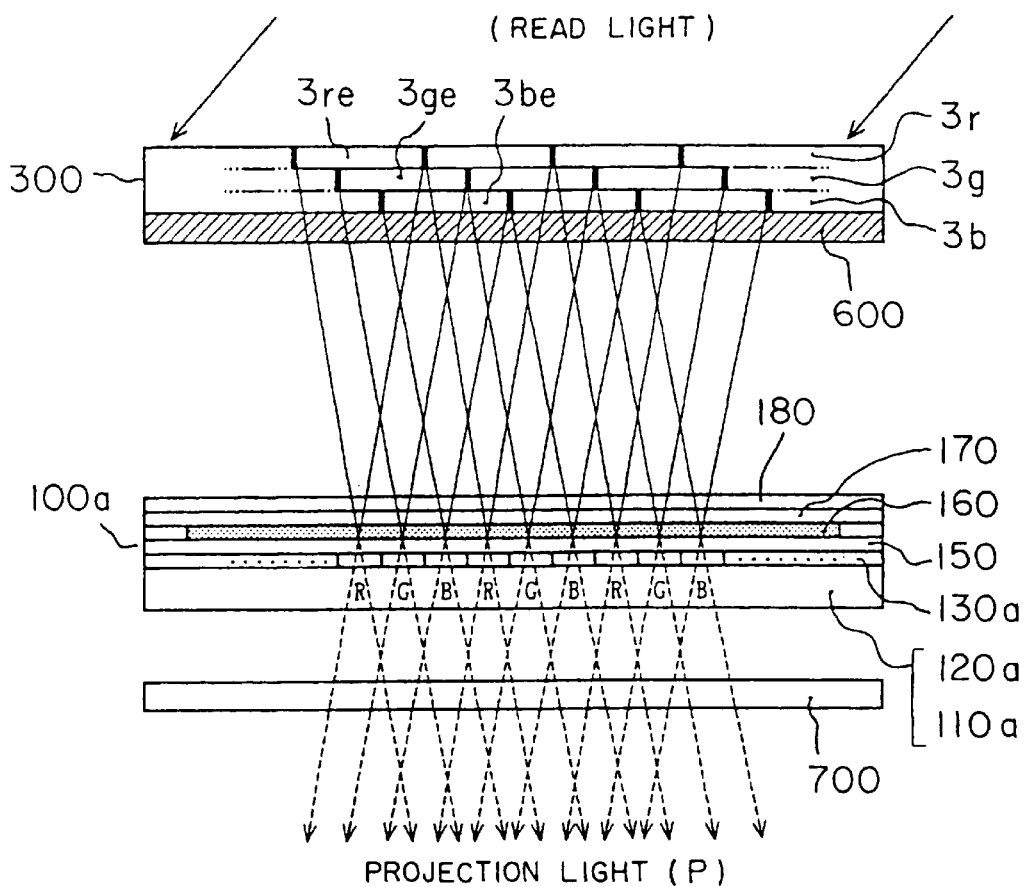
FIG. 24 illustrates the fifth embodiment of a liquid crystal picture displaying apparatus according to the invention.

FIG. 24 illustrates the fifth embodiment which includes the color filter 300, the half wavelength plate 600, a liquid crystal display 100a, and an analyzer 700.

The liquid crystal display 100a has the stacked layer structure like that of the third embodiment except that no dielectric mirror film is interposed, and pixel electrodes of a pixel electrode layer 130a, an active matrix drive circuit 120a and a Si substrate 110a are made of transparent material. Furthermore, like the third embodiment, the direction where the orientation direction of the liquid crystals of the light modulation layer 160 is projected onto the pixel electrode layer 130a is the direction perpendicular to drawing surface in FIG. 24, and matches the direction of a stripe alignment of pixel electrodes of R, G and B. The analyzer 700 has a function to allow only P-polarized light components to pass therethrough of modulated light passing through the liquid crystal display 100a.

In the fifth embodiment, S-polarized light components of respective colors diffracted by the color filter 300 are focused onto pixel electrodes for the corresponding colors of the pixel electrode layer 130a. In that light focusing process, the polarized light passes through the half wavelength plate 600 and its polarization plane is rotated by 45°. Furthermore, the polarized light is modulated by the liquid crystals of the light modulation layer 160 and its polarization plane is rotated by 90°. The polarized light is then emitted from the liquid crystal display 100a to the analyzer 700.

Rotation of polarization plane at the half wavelength plate 600 and the light modulation layer 160 is fundamentally similar to that explained with reference to FIGS. 22(A) to 22(E) in the third embodiment. The fifth embodiment differs from the third embodiment in that, in the modulation process as shown in FIGS. 22(D) to 22(E), polarized light passes through the pixel electrode as it is after modulation at the liquid crystal layer, and is emitted from the pixel electrode.

Accordingly, the polarization plane of polarized light passed through the half wavelength plate 600 is set in a direction where it is modulated most efficiently at the liquid crystal layer, and disclination can be suppressed that would be generated at the liquid crystals due to a lateral electric field produced across pixel electrodes for different colors.

In the third embodiment, the modulated P-polarized light components and the non-modulated S-polarized light components re-enter the color filter 300. By the diffraction characteristics of the color filter 300, the non-modulated S-polarized light components return to the read light entrance side, and only the modulated P-polarized light components are permitted to pass therethrough.

On the contrary, in the fifth embodiment, since the liquid crystal display 100a is of transmission-type, the modulated and non-modulated polarized light components are emitted from the liquid crystal display 100a as they are. The fifth embodiment thus employs the analyzer 700 at the emitting side of the liquid crystal display 100a to allow only the modulated polarized light components to pass therethrough as projection light beams.

Next, the sixth preferred embodiment of a liquid crystal displaying apparatus according to the present invention will be described.

Figure 25:
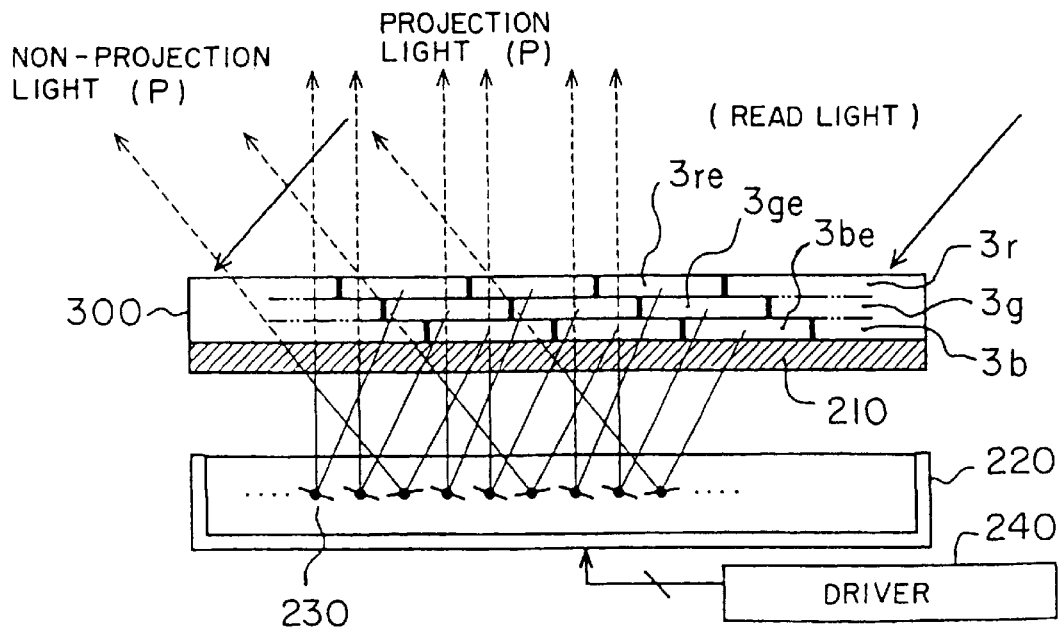
FIG. 25 illustrates the sixth embodiment of a liquid crystal picture displaying apparatus according to the invention.

The sixth embodiment is, as shown in FIG. 25, provided with a micro mirror device 220 and the color filter 300 used in the third embodiment and a quarter wavelength plate 210.

The quarter wavelength plate 210 is provided so that its crystal optical axis takes an angle of substantially 45° to the polarization plane of S polarized-light components diffracted by the color filter 300.

The micro mirror device 220 has a mirror surface where there are arranged a large number of micro mirrors 230 rotatably supported by a minute mechanism on a semiconductor substrate. The micro mirror device 220 serves to separately control rotational angles of the micro mirrors 230 by electrostatic field generating circuits (not shown) with memory elements provided immediately below the respective micro mirrors.

The micro mirrors 230 for respective color pixels are arranged in a stripe in correspondence with holographic lenses 3re, 3ge and 3be of the color filter 300. A driver 240 selectively switches the electrostatic field generating circuits in accordance with pixel signals to vary the rotational angles of the respective micro mirrors 230 so that they take two states.

In detail, as shown in FIG. 26(A), when an electrostatic field generating circuit is turned on, the micro mirror 230 is allowed to reflect read light beams in the vertical direction (projection direction). On the other hand, as shown in FIG. 26(B), when an electrostatic field generating circuit is turned off, the micro mirror 230 is allowed to reflect the read light beams in a direction greatly inclined against the projection direction. The rotational angles of the respective micro mirrors 230 are individually controlled so that they take any one of the above states, thereby making it possible to select the incident light beams as projection light beams or not.

In FIG. 25, the color filter 300 focuses the S-polarized light components obtained by diffracting the read light onto the micro mirrors 230 for the corresponding colors via the quarter wavelength plate 210. The S-polarized light components that pass through the quarter wavelength plate 210 are converted into circularly polarized light components because the crystal optical axis of the quarter wavelength plate 210 has an angle of 45° to the polarization plane of the S-polarized light components.

The circularly polarized light components focused onto the respective mirror surfaces are reflected in a direction of projection or another direction of non-projection by control of the respective micro mirrors 230 according to pixel signal, and re-enter the quarter wavelength plate 210. The circularly polarized light components are converted by the quarter wavelength plate 210 into P-polarized light components. The P-polarized light components are then emitted to the color filter 300.

Accordingly, all the polarized light components reflected by the micro mirrors 230 become P-polarized light components, which pass through the color filter 300 as they are without diffraction. As a result, they are separately emitted in a direction of projection and another direction of non-projection under the control of the respective micro mirrors 230.

In the sixth embodiment, light reflected by the micro mirror 230 while being on is used as projection light, In this regard, FIG. 25 shows that only the P-polarized light components for the colors R and G become projection light beams, and the P-polarized light components for the color B becomes non-projection light beams. Projection light beams representing a yellow region can be obtained. Full-color display can be achieved by changing combination of colors by the micro mirrors 230.

Conventional color displaying apparatus with micro mirror device have employed a method of displaying a full-color image by synthesizing projection light beams of respective colors by means of three micro mirror devices corresponding to the primary colors R, G and B, and a method of refreshing the primary colors R, C and B by switching color of projection beams for sufficiently short period with respect to a video field period with a single micro mirror device of high density pixel with rotating a color wheel or with the LCD multi-color shutter system.

Contrary to these conventional apparatus, the sixth embodiment achieves full-color display only by the stacked layer structure of color filter 300, quarter wavelength plate 210 and single micro mirror device chip, which is extremely simple configuration.

As described above, the present invention provides reflection- and transmission-type liquid crystal color displaying apparatuses that achieve high quality color display without lowering of luminance of pure color and off-balance of complementary color relationship which would occur due to disclination of liquid crystals caused by a lateral electric field across pixel electrodes for different color pixels in the liquid crystals.

What is claimed is:

1. A liquid crystal displaying apparatus comprising:
   a reflection-type liquid crystal display including vertical orientation-mode liquid crystals, to modulate linearly polarized light;
   polarizing and diffracting means, provided so as to face the liquid crystal display, for converting read light beams obliquely incident thereto to the linearly polarized light, allowing the linearly polarized light to be incident to the liquid crystal display, allowing first polarized light components of the linearly polarized light modulated by the liquid crystal display to pass therethrough, the first polarized light components vibrating in a first direction perpendicular to a second direction in which the linearly polarized light vibrates, and diffracting second polarized light components of the linearly polarized light to a third direction from which the read light beams be incident to the liquid crystal display, the second polarized light components vibrating in the second direction;
   a quarter wavelength plate, provided at the output side of the polarizing and diffracting means, to allow elliptically polarized light which includes the first polarized light components and a small quantity of the second polarized light components to pass therethrough when the liquid crystal display is active for modulation, the quarter wavelength plate having a crystal optical axis that is set in a direction so that the elliptically polarized light is converted into polarized light closest to linearly polarized light when the liquid crystal display is not active for modulation; and a polarizer, provided at the output side of the polarizing and diffracting means, to allow polarized light components of the elliptically polarized light to pass therethrough, the polarized light components matching a transmission axis of the polarizer, the transmission axis being set in a direction perpendicular to another direction in which the polarized light converted by the quarter wavelength plate vibrates, so as not to allow the converted polarized light to pass therethrough.

* * * * *